US009277430B2

(12) United States Patent
Gopal et al.

(10) Patent No.: US 9,277,430 B2
(45) Date of Patent: Mar. 1, 2016

(54) METHOD AND APPARATUS FOR ENHANCED TD-SCDMA TO LTE MEASUREMENT REPORTING

(71) Applicant: QUALCOMM Incorporated, San Diego, CA (US)

(72) Inventors: Thawatt Gopal, San Diego, CA (US); Heng Zhou, San Diego, CA (US); Qingxin Chen, Del Mar, CA (US); Yu Fu, San Diego, CA (US); Tom Chin, San Diego, CA (US); Zhengming Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/243,736

(22) Filed: Apr. 2, 2014

(65) Prior Publication Data

US 2015/0289153 A1    Oct. 8, 2015

(51) Int. Cl.
*H04W 24/08*    (2009.01)
*H04W 36/00*    (2009.01)
*H04W 36/14*    (2009.01)

(52) U.S. Cl.
CPC .......... *H04W 24/08* (2013.01); *H04W 36/0083* (2013.01); *H04W 36/0088* (2013.01); *H04W 36/14* (2013.01)

(58) Field of Classification Search
CPC ............ H04W 24/08; H04W 36/0083; H04W 36/0088; H04W 36/14
See application file for complete search history.

(56) References Cited

U.S. PATENT DOCUMENTS

| 2007/0097914 A1 | 5/2007 | Grilli et al. |
| 2008/0189970 A1 | 8/2008 | Wang et al. |
| 2008/0220784 A1 | 9/2008 | Somasundaram et al. |
| 2009/0185524 A1* | 7/2009 | Sammour et al. ............. 370/328 |

(Continued)

FOREIGN PATENT DOCUMENTS

| EP | 2 262 315 A1 | 12/2010 |
| WO | WO-2012136889 A1 | 10/2012 |

OTHER PUBLICATIONS

Awada A., et al., "A SON-Based Algorithm for the Optimization of Inter-RAT Handover Parameters," IEEE Transactions on Vehicular Technology, Jun. 2013, vol. 62 (5), pp. 1906-1923.

(Continued)

*Primary Examiner* — Nathan Mitchell
(74) *Attorney, Agent, or Firm* — Arent Fox LLP

(57) ABSTRACT

Aspects of the methods and apparatus include determining that a time-to-trigger (TTT) timer has expired, and determining that a serving radio access technology (RAT) received signal characteristic is less than a signal characteristic threshold when the TTT timer has expired. Further, the aspects include determining, in response to the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration. Also, the aspects include calculating a measurement gap duration sufficient to complete the target RAT frequency measurement associated with the MRM for performing the IRAT handover, and configuring a new measurement gap prior to the time limit, wherein the new measurement gap comprises the calculated measurement gap duration.

30 Claims, 12 Drawing Sheets

(56) References Cited

U.S. PATENT DOCUMENTS

| | | | |
|---|---|---|---|
| 2009/0325501 A1 | 12/2009 | Somasundaram et al. | |
| 2010/0323633 A1 | 12/2010 | Pani et al. | |
| 2011/0243047 A1 | 10/2011 | Dayal et al. | |
| 2012/0202557 A1* | 8/2012 | Olofsson et al. | 455/525 |
| 2013/0235849 A1 | 9/2013 | Ekici et al. | |
| 2013/0242796 A1* | 9/2013 | Chen et al. | 370/252 |
| 2013/0244590 A1* | 9/2013 | Nukala et al. | 455/77 |
| 2013/0288742 A1* | 10/2013 | Yao et al. | 455/553.1 |
| 2014/0094125 A1* | 4/2014 | Behravan et al. | 455/63.1 |
| 2015/0011219 A1* | 1/2015 | Saily et al. | 455/436 |
| 2015/0065136 A1* | 3/2015 | Lee et al. | 455/436 |
| 2015/0172949 A1* | 6/2015 | Lee et al. | 455/436 |

OTHER PUBLICATIONS

International Search Report and Written Opinion—PCT/US2015/023068—ISA/EPO—Jun. 22, 2015. (14 total pages).

Qualcomm Europe: "CSFB long measurement gap" 3GPP Draft; R4-093714 CSFB Long Measurement Gap, 3rd Generation Partnership Project (3GPP), Mobile Competence Centre ; 650, Routes Des Lucioles ; F-06921 Sophia-Antipolis Cedex, France, No. Miyazaki; 20091012, Oct. 12, 2009, XP050393321, [retrieved on Oct. 9, 2009] the whole document.

\* cited by examiner

METHOD AND APPARATUS FOR ENHANCED TD-SCDMA TO LTE MEASUREMENT REPORTING

BACKGROUND

Aspects of the present disclosure relate generally to wireless communication systems, and more particularly, for reporting Time Division Synchronous Code Division Multiple Access (TD-SCDMA) to Long Term Evolution (LTE) inter-system Radio Access Technology (IRAT) frequency measurements to a radio network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the UMTS, a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, reporting LTE frequency measurements by a user equipment (UE) to a radio network for an inter-radio access technology (IRAT) handover from one radio access technology (RAT), e.g., TD-SCDMA, to a particular LTE frequency is challenging because of the time required to complete the measurements for a particular LTE frequency. Thus, there is a need for quickly completing and reporting IRAT frequency measurements of a particular LTE frequency to a radio network, thereby providing consistent service in a wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication operable by a user equipment includes determining that a time-to-trigger (TTT) timer has expired, and determining that a serving radio access technology (RAT) received signal characteristic is less than a first signal characteristic threshold when the TTT timer has expired. Further, the method includes determining, in response to the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration. Additionally, the method includes calculating a measurement gap duration sufficient to complete the target RAT frequency measurement associated with the MRM for performing the IRAT handover, and configuring a new measurement gap prior to the time limit, wherein the new measurement gap comprises the calculated measurement gap duration.

In another aspect, an apparatus for wireless communication includes at least one processor and a memory coupled with the at least one processor, where the at least one processor is configured to determine that a time-to-trigger (TTT) timer has expired, and to determine that a serving radio access technology (RAT) received signal characteristic is less than a first signal characteristic threshold when the TTT timer has expired. Further, the at least one processor is configured to determine, in response to the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration. Additionally, the at least one processor is configured to calculate a measurement gap duration sufficient to complete the target RAT frequency measurement associated with the MRM for performing the IRAT handover, and to configure a new measurement gap prior to the time limit, wherein the new measurement gap comprises the calculated measurement gap duration.

In another aspect, an apparatus for wireless communication includes means for determining that a time-to-trigger (TTT) timer has expired, and means for determining that a serving radio access technology (RAT) received signal characteristic is less than a first signal characteristic threshold when the TTT timer has expired. Further, the apparatus includes means for determining, in response to the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration. Additionally, the apparatus includes means for calculating a measurement gap duration sufficient to complete the target RAT frequency measurement associated with the MRM for performing the IRAT handover, and means for configuring a new measurement gap prior to the time limit, wherein the new measurement gap comprises the calculated measurement gap duration.

In yet another aspect, a non-transitory computer-readable media for wireless communication includes machine-executable code for causing a computer to determine that a time-to-trigger (TTT) timer has expired, and to determine that a serving radio access technology (RAT) received signal characteristic is less than a first signal characteristic threshold when the TTT timer has expired. Further, the machine-executable code causes the computer to determine, in response to the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration. Additionally, the machine-executable code causes the computer to calculate a measurement gap duration sufficient to complete the target RAT frequency measurement associated with the MRM for performing the IRAT handover, and to configure a new measurement gap prior to the time limit, wherein the new measurement gap comprises the calculated measurement gap duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, inter-radio access technology (IRAT) measurements are utilized for handover between different RATs in a radio access network. A mobile terminal (or UE) active in one RAT performs neighbor cell measurements with neighboring cells of another RAT and sends a measurement report to a network, e.g., a serving node of the current RAT. Based on the measurement report provided by the UE, the network can initiate handover of the UE from one RAT to another RAT.

Before transmitting event-based reporting to the network for TD-SCDMA to LTE IRAT measurements, a UE may initialize a time-to-trigger (TTT) timer when certain event conditions occur (e.g., where serving RAT is less than a threshold, and target RAT is above a threshold, referred to as an event 3a). Upon expiration of the TTT timer, the UE may request and perform an updated TD-SCDMA to LTE IRAT measurement if the event conditions triggering the event are still valid or ongoing. If the event is still ongoing, the UE may then transmit a measurement report message (MRM) to a serving node of the network. The MRM, in this context, refers to and/or includes the frequency measurement and reporting criteria for the UE to transfer from one RAT to another RAT. For instance, the MRM contains the IRAT measurement results and corresponding event type that triggered the UE to perform the IRAT measurements. The network may then utilize the MRM to trigger either IRAT redirections or IRAT handover of the UE, e.g., from TD-SCDMA to LTE.

According to the present apparatus and methods, when, e.g., TD-SCDMA signal strength or quality of a serving node is weak, e.g., below a threshold, then the UE may expedite a target node RAT LTE measurement in order to transmit the MRM to the network sooner, or at an increased rate, such that the network may be able to quickly complete IRAT redirection or IRAT handover for the UE. For example, by quickly completing and reporting TD-SCDMA to LTE IRAT frequency measurements of a particular LTE frequency to a radio network, call drops between the radio network and the UE may decrease.

Figure 1A:
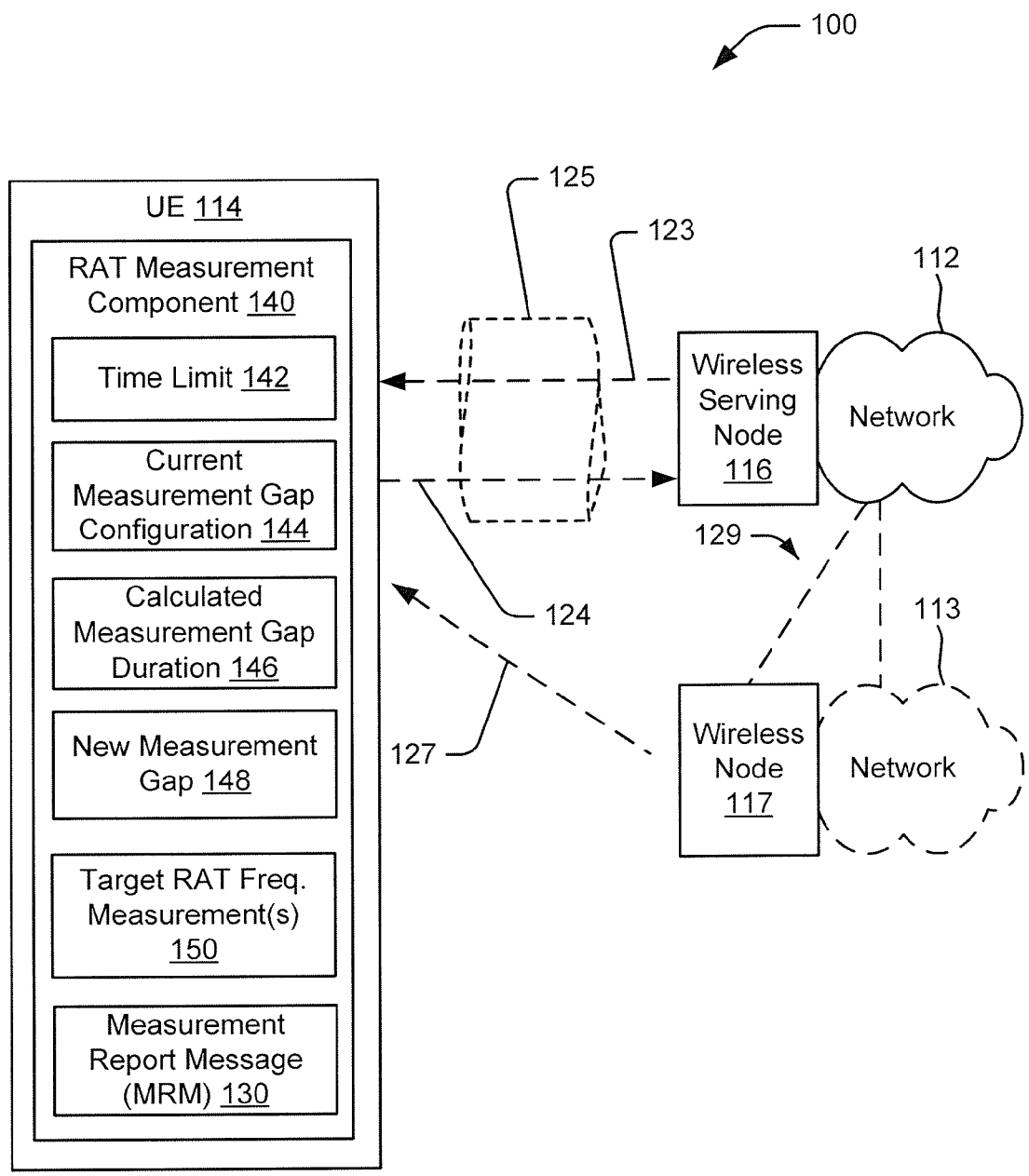
FIG. 1A is a schematic diagram illustrating an aspect of a RAT measurement component in a wireless communication system.

Referring to FIG. 1A, in one aspect, a wireless communication system 100 is configured to facilitate wireless communication between at least one UE 114 and one or more networks 112 via one or more serving nodes, including, but not limited to, wireless serving node 116 over one or more wireless link 125. The one or more wireless links 125, may include, but are not limited to, signaling radio bearers and/or data radio bearers. Wireless serving node 116 may be configured to transmit one or more signals 123 to UE 114 over the one or more wireless links 125, and/or UE 114 may transmit one or more signals 124 to wireless serving node 116. In an aspect, signals 123 and signals 124 may include, but are not limited to, one or more messages, which may transmit data or signaling from the UE 114 to the network via wireless serving node 116.

According to the present aspects, wireless communication system 100 includes wireless serving node 116 operating according to a first radio access technology (RAT), and a neighboring wireless node 117 operating according to a second RAT different from the first RAT. In an example, which should not be construed as limiting, first RAT may be TD-SCDMA and second RAT may be LTE. Moreover, UE 114 may be in connected mode with wireless serving node 116, and UE 114 may be in communication with or at least able to receive a transmitted signal 127 from wireless node 117, which may be referred to as a neighbor node in the second RAT. It should be noted that, although illustrated as separate nodes in separate locations, wireless node 117 may be integral with or co-located with wireless serving node 116. Additionally, wireless node 117 of the second RAT may provide UE 114 with access to network 112, e.g., via communication link 129, or to network 113, which may be the same as or connected to network 112. As noted above, the occurrence or persistence of one or more events or radio conditions may cause UE 114 to make measurements with respect to wireless serving node 116 and wireless node 117, and to transmit a measurement report message (MRM) 130 to wireless serving node 116. In an aspect, for example, the event or radio condition may include, but is not limited to, a signal characteristic of wireless serving node 116 relative to a threshold, such as a received signal strength or quality characteristic relative to a received signal strength or quality threshold, or such as the received signal strength or quality characteristic relative to a receiver sensitivity threshold. Wireless serving node 116 or another network component of network 112 may then consider the contents of MRM 130 in making decisions, such as IRAT redirections or IRAT handover of UE 114, e.g., from TD-SCDMA to LTE. For instance, in this context, wireless node 117 may be referred to as a target node or a target RAT.

As such, UE 114 may further include a RAT measurement component 140 configured to quickly complete and report TD-SCDMA to LTE IRAT frequency measurements of a particular LTE frequency to a radio network, such as to wireless serving node 116. For example, in an aspect, RAT measurement component 140 may be configured to determine that a target RAT frequency measurement 150 associated with the MRM 130 for performing an inter-RAT handover cannot be completed within a time limit 142 according to a current measurement gap configuration 144, to calculate a measurement gap duration 146 sufficient to complete the target RAT frequency measurement associated with the MRM 130 for performing the IRAT handover, and to configure a new measurement gap 148 having the calculated measurement gap duration 146. It should be noted that the term "measurement gap" generally refers to a set time period during which at least no downlink transmissions will be scheduled by wireless serving node 116 so that the UE 114 can perform various measurements, e.g., receive signals from another RAT. UE 114 may then obtain the target RAT frequency measurement 150, which may be a set of one or more measurements, e.g., depending on a communication standard or operator implementation, prior to the time limit 142. In an aspect, the time limit 142 may be a fixed amount of time, e.g., set by a network operator or device/component manufacturer, or a dynamic value that may vary, for example, based on the characteristic of wireless serving node 116 relative to a threshold, as described above. In other words, according to operation of the present apparatus and methods, the calculated measurement gap duration 146 and configuration of new measurement gap 148 provides UE 114 with the opportunity and the time to perform the target RAT frequency measurement 150, e.g., one or more measurements at one time or in one shot, thereby enabling MRM 130 to provide wireless serving node 116 with sufficient information for making decisions such as IRAT redirections or IRAT handover of UE 114, e.g., such as from TD-SCDMA to LTE.

As used herein, it should be noted that UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, as used herein, it should be noted that the one or more wireless nodes, including, but not limited to, wireless serving node 116 and wireless node 117 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 1B:
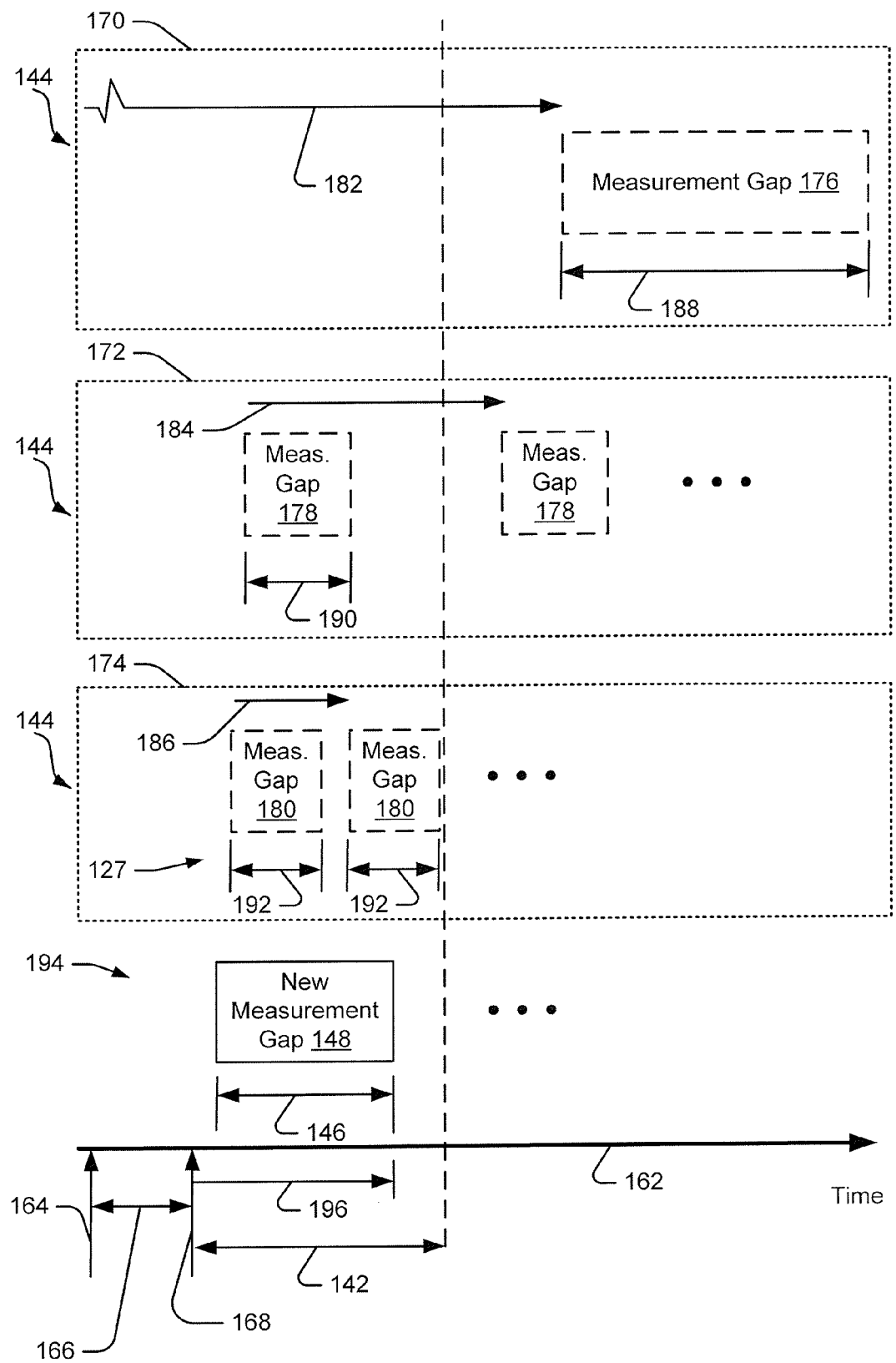
FIG. 1B is a schematic diagram of a timeline that includes the occurrence of events, example measurement gap configurations, and the generation of a new measurement gap according to one non-limiting example of operation of the aspects of FIG. 1.

Referring to FIG. 1B, in one example aspect that should not be construed as limiting, a schematic diagram 160 representing an example of the present aspects includes timeline 162 during which UE 114 detects an initial event 164 that may indicate that an inter-RAT handover, e.g., a TD-SCDMA to LTE handover, would be desired. Initial event 164 may include, but is not limited to, a set of radio conditions where a serving RAT characteristic is less than a threshold, and a target RAT characteristic is above a threshold. For instance, the characteristic may be a received signal characteristic, such as a receive signal strength or quality, and the threshold may be a corresponding received signal strength or quality threshold or receiver sensitivity. For instance, initial event 164 may be referred to as an "event 3a" in some communication standards. As such, based on initial event 164, UE 114 initiates a waiting time period 166, which may also be referred to as a time-to-trigger (TTT) time and which may be tracked by a TTT timer on UE 114, to determine if the conditions of initial event 164 are persistent. As such, at the expiration time 168 of waiting time period 166, UE 114 may obtain one or more additional measurements that may be used to determine if the inter-RAT handover is still desired.

Prior to the present disclosure, UE 114 would be limited to current measurement gap configuration 144 for obtaining measurements. However, current measurement gap configuration 144 may not provide UE 114 with sufficient opportunity to obtain the target RAT frequency measurement 150 prior to a call drop, for example, if an individual gap duration or a sum of the individual gap durations are not long enough. For example, a first current measurement gap configuration 170, or a second current measurement gap configuration 172, or a third current measurement gap configuration 174 may include respective measurement gaps 176, 178, and 180 that each occur at respective periodicities 182, 184, and 186. It should be noted that, in general, UE 114 would only operate with one of first current measurement gap configuration 170, second current measurement gap configuration 172, or third current measurement gap configuration 174, but the different configurations are being shown together in FIG. 1B for illustrative purposes. Further, in each configuration 172, 174, and 176, the respective individual measurement gap duration 188, 190, and 192, or the sum thereof, occurring before time limit 142 may not be sufficient to obtain the target RAT frequency measurement 150. For instance, in one example, target RAT frequency measurement 150 may include a set of one or more measurements, and may have a measurement time of 30 milliseconds (ms), and time limit 142 may be 100 ms. So, first current measurement gap configuration 170 is insufficient as measurement gap 176 has a sufficient measurement gap duration 188, e.g., greater than 30 ms, but based on periodicity 182, measurement gap 176 does not occur prior to time limit 142. Similarly, second current measurement gap configuration 172 is insufficient as measurement gap duration 190 of measurement gap 178 is too short, e.g., less than 30 ms, and only a single measurement gap 178 occurs prior to time limit 142 based on periodicity 184. Similarly, third current measurement gap configuration 174 is insufficient as a sum of measurement gap durations 192 of measurement gaps 180 occurring prior to time limit 142, based on periodicity 186, is too short, e.g., less than 30 ms.

In an alternative or additional aspect, it should be noted that UE 114 may deem a current measurement gap configuration insufficient when a duration of one or more measurement gaps is long enough, e.g., 30 ms or greater using the above example, but that target RAT frequency measurement 150 does not occur fast enough or in a minimum amount of time 196, e.g., relative to expiration time 168 of waiting time period 166. In an aspect, for example, minimum amount of time 196 is a shortest time in which new measurement gap 148 may be configured and measurements performed by UE 114. For instance, UE 114 may determine that the time used to complete target RAT frequency measurement 150 needs to be as fast as possible, or within minimum amount of time 196, when UE 114 is moving and/or when UE 114 is losing coverage of wireless serving node 116.

In the present aspects, however, UE 114 determines whether current measurement configuration 144 allows the target RAT frequency measurement 150 to be obtained within time limit 142. If not, then UE 114 generates calculated measurement gap duration 146, e.g., which may include identifying a known value of time needed to perform the target RAT frequency measurement 150. As such, UE 114 then generates a modified measurement gap configuration 194 that includes new measurement gap 148 having calculated measurement gap duration 146, and configured to be positioned to obtain target RAT frequency measurement 150 within time limit 142. It should be noted that new measurement gap 148 may be an entirely new measurement gap, or a modified version of an existing measurement gap, wherein the modification may include one or both of starting the measurement gap earlier in time or ending the measurement gap later in time. In an aspect, new measurement gap 148 having calculated measurement gap duration 146 includes a single, continuous measurement gap, e.g., such that target RAT frequency measurement 150 may be obtained during a single measurement gap or in "one shot."

In an alternative or addition aspect, UE 114 configures new measurement gap 148 so that the target RAT frequency measurement 150 may be obtained in a minimum amount of time 196 from expiration time 168.

In an alternative or additional aspect, it should be noted that modified measurement gap configuration 194 may prioritize target RAT frequency measurement 150, when more than one RAT frequency is configured to be measured, so that target RAT frequency measurement 150 occurs first-in-time within new measurement gap 148 relative to the other RAT frequency measurements. As such, in some cases where more than one RAT frequency is configured to be measured, modified measurement gap configuration 194 may cause target RAT frequency measurement 150 to be the only measurement that occurs within new measurement gap 148.

Also, it should be noted that modified measurement gap configuration 194 may be the same as any current measurement gap configuration 144 but with the addition of new measurement gap 148.

In an alternative or additional aspect, it should be noted that UE 114 may condition the above-noted operations, e.g., the generation of new measurement 148, upon current call domain type information. In other words, UE 114 may only perform the above-noted functions and generate new measurement gap 148 when UE 114 is in a specific call domain type, such as a packet switched (PS) call domain, whereas UE 114 may not perform the above-noted functions when in a circuit switched (CS) call domain.

Figure 2:
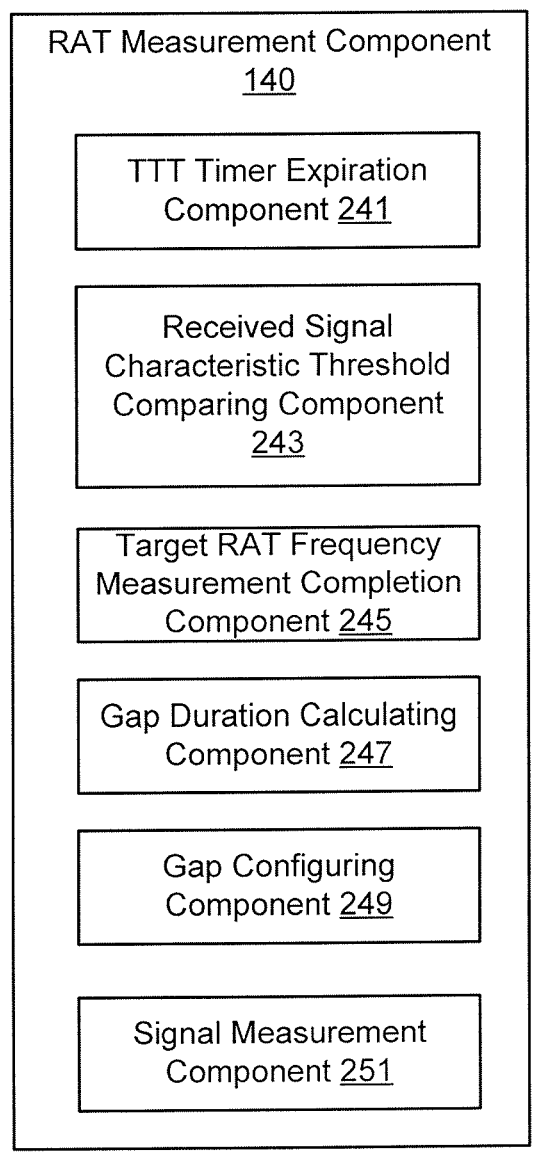
FIG. 2 is a schematic diagram illustrating a more detailed aspect of the RAT measurement component of FIG. 1.

Thus, according to the present apparatus and methods, UE 114 may obtain the target RAT frequency measurement 150 for MRM 130, e.g., relating to TD-SCDMA to LTE handover, and forward MRM 130 to a network component for evaluation of inter-RAT handover or redirection, Referring to FIG. 2, an example, more detailed aspect of RAT measurement component 140 is presented. In this example, RAT measurement component 140 may be configured to include a TTT timer expiration component 241 capable of initiating a TTT timer upon occurrence of event 164, and/or determining that waiting period 166, e.g., based on initiation of TTT timer, has expired. The RAT measurement component 140 may also include a signal characteristic threshold comparing component 243 that determines, when the TTT timer has expired, whether a received serving RAT signal strength or quality, e.g., of wireless serving node 116, is less than a received signal strength or quality threshold. In an alternative or additional aspect, signal characteristic threshold comparing component 243 may be operable to determine, when the TTT timer has expired, whether a target RAT frequency signal strength or quality, e.g., of wireless serving node 117, is greater than a signal strength or quality threshold. It should be noted that the received signal strength or quality threshold for the serving RAT and the target RAT may be the same, or each RAT may have a different threshold value, e.g., a first threshold for serving RAT and a second threshold for target RAT, which may have respective values set by a network operator to make it easier or more difficult to achieve a radio condition sufficient to warrant an IRAT handover. In other words, signal characteristic threshold comparing component 243 may be operable to determine or otherwise indicate occurrence of event 164. RAT measurement component 140 may also include a target RAT frequency measurement completion component 245 capable of determining whether target RAT frequency measurement 150, e.g., of signals from wireless node 117, can be completed within time limit 142. In this context, the target RAT frequency measurement 150 is associated with the MRM 130 for performing IRAT handover, and target RAT frequency measurement completion component 245 make its determination in response to the serving RAT signal strength or quality being less than the signal strength or quality threshold or within a predetermined range of a UE receiver sensitivity. For instance, target RAT frequency measurement completion component 245 may determine that the time required to complete target RAT frequency measurement 150 associated with the MRM 130 for completing a IRAT handover from one RAT to another RAT may fall outside time limit 142.

In an additional aspect, RAT measurement component 140 may be configured to include a gap duration calculating component 247 capable of calculating or otherwise identifying a measurement gap duration sufficient to complete the target RAT frequency measurement 150 associated with the MRM 130 for performing the IRAT handover. Additionally, RAT measurement component 140 may also be configured to include a gap configuring component 249 operable to create a new measurement gap or enlarge a network configured measurement gap, thereby defining new measurement gap 148, based on the calculated measurement gap duration 146.

Further, RAT measurement component 140 may be configured to include a signal measurement component 251, e.g., a receiver or transceiver, operable to receive signals on one or more frequencies from wireless serving node 116 on first RAT, and wireless node 117 on a second RAT. Moreover, signal measurement component 251 may measure the received signals, and communicate with TTT timer expiration component 241 and signal characteristic threshold comparing component 243 to initiate the TTT timer and also to perform the subsequent target RAT frequency measurement 150.

Figure 3:
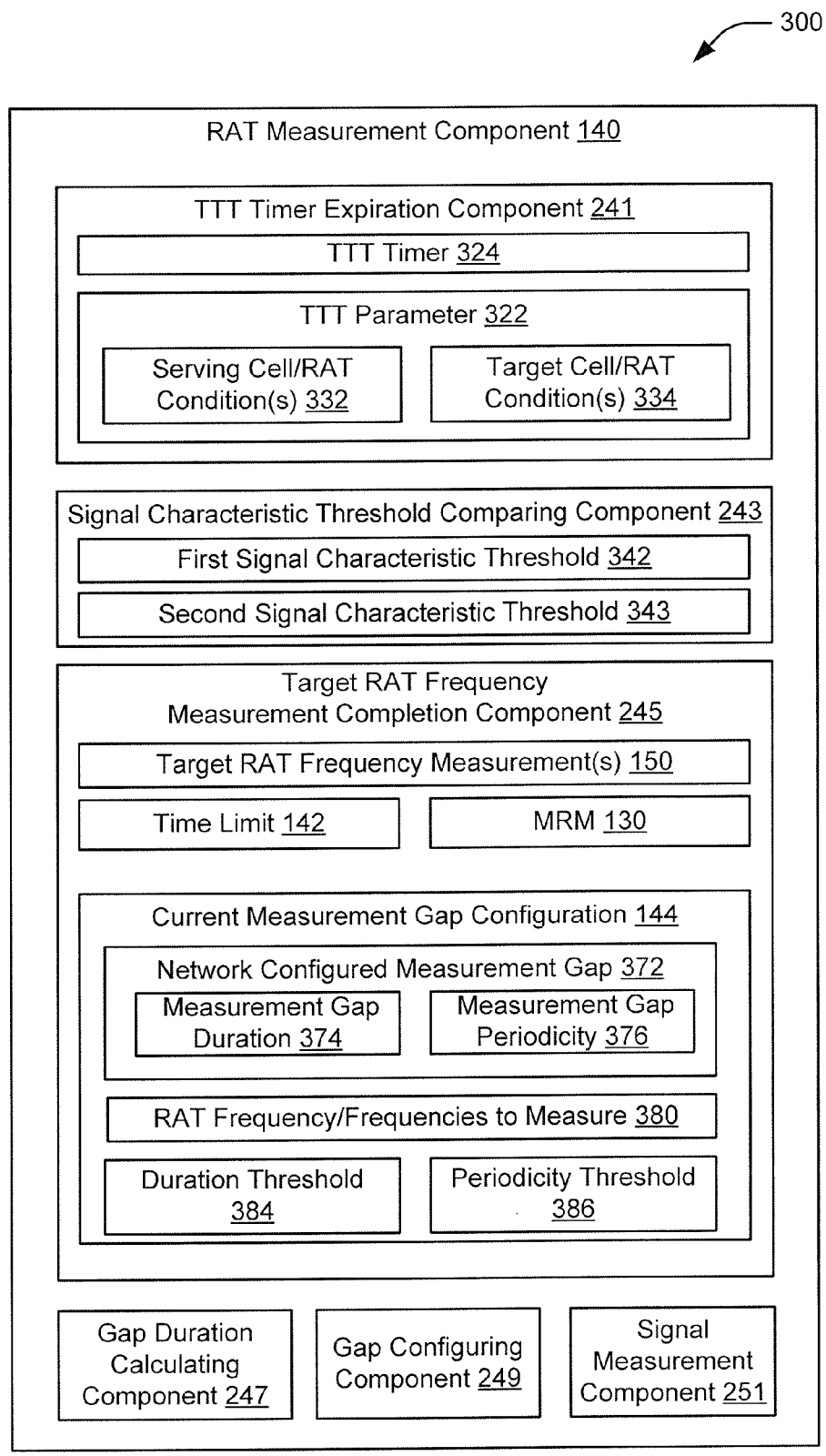
FIG. 3 is a schematic diagram illustrating a more detailed aspect of the components of the RAT measurement component of FIG. 1.

Referring to FIG. 3, a more detailed aspect of the RAT measurement component 140, of FIGS. 1A and 2, may include additional components that interoperate to, for example, quickly complete and report TD-SCDMA to LTE IRAT measurements of a particular LTE frequency to a radio network associated with UE 114. In this aspect, RAT measurement component 140 of UE 114 may be configured to quickly transmit the obtained target RAT measurements 150 and corresponding information relating to event 164 to network 112 in order to complete RAT handover from one type of RAT (e.g., TD-SCDMA) to another type of RAT (e.g., LTE). In an example, as discussed above, when a received signal strength or quality of serving cell (e.g., wireless serving node 116) operating according to one type of RAT (e.g., TD-SCDMA) is weak, UE 114 may expedite a target RAT (e.g., LTE) measurement 150 (e.g., of signal from wireless node 117) in order to transmit the MRM 130 to the network sooner (than without operation according to the present aspects) to quickly complete IRAT redirection and IRAT handover.

In an aspect, RAT measurement component 140 may be configured, among other things, to include the TTT timer expiration component 241 (FIG. 2) capable of determining that a TTT timer 324 has expired. For example, UE 114 may be configured with one or more TTT parameters 322 that trigger UE 114 to start TTT timer 324 and to execute TTT timer expiration component 241 to determine when TTT timer 324 has expired in order to initiate RAT frequency measurements. The TTT parameters 322 may include one or more serving cell/RAT conditions 332 and/or one or more target cell/RAT conditions 334, such as but not limited to, an event 3a, a serving cell/RAT received signal strength or quality level relative to a threshold, a serving cell/RAT received signal strength or quality level relative to a receiver sensitivity, a target cell/RAT received signal strength or quality level relative to a threshold, a target cell/RAT received signal strength or quality level relative to a receiver sensitivity, or any other parameters, values or conditions relating to a serving cell/RAT (e.g., wireless serving node 116 operating according to first RAT) and/or a target cell/RAT (e.g., wireless node 117 operating according to second RAT different from first RAT).

It should be noted that event 3a, in this context, includes an inter-RAT reporting event that is generated when the estimated received signal strength or quality of the currently used RAT is below a certain threshold and the estimated received signal strength or quality of a target RAT is above a certain threshold.

In an example aspect, which should not be construed as limiting, the received signal characteristic, such as "estimated signal strength" or "estimated quality" of serving cell/RAT (e.g., wireless serving node 116 operating according to first RAT) and/or of a target cell/RAT (e.g., wireless node 117 operating according to second RAT different from first RAT), may include or may relate to a received signal strength level or received signal quality level. For example, in an aspect that should not be construed as limiting, when a serving cell/RAT operates according to TD-SCDMA, then the received signal characteristic may include a parameter such as a Received Signal Code Power (RSCP) (e.g., in units of dBm). In another example aspect, which should not be construed as limiting, when a target cell/RAT operates according to LTE, the received signal characteristic level may include a parameter such as Reference Symbol Receive Power (RSRP) (e.g., in units of dBm) or Reference Symbol Received Quality (RSRQ) (e.g., in units of dB).

Further, RAT measurement component 140 may be configured to include the signal characteristic threshold comparing component 243 for determining when one or more TTT parameters 322 are met in order to identify a scenario in which RAT redirection or handover may be implemented. For example, signal characteristic threshold comparing component 243 identifies when serving cell/RAT conditions 332 of a serving node operating according to a first RAT (e.g., wireless serving node 116) indicate less than desirable conditions for handling communications for UE 114. In an alternative or additional example, signal characteristic threshold comparing component 243 identifies when target cell/RAT conditions 334 of a neighbor node operating according to a different RAT (e.g., wireless node 117) indicate good or sufficient conditions for handling communications for UE 114. As such, for example, when the serving cell/RAT is TD-SCDMA and the measured RSCP of the serving cell/RAT is less than a first signal characteristic threshold 342, and when the target cell/RAT is LTE and the measured RSRP or RSRQ of the target cell/RAT is greater than a second signal characteristic threshold 343, then RAT measurement component 140 may be triggered to initiate TTT timer 324, and to determine when TTT timer 324 has expired in order to initiate RAT frequency measurements.

It should be noted that first signal characteristic threshold 342 and second signal characteristic threshold 343 may be different values, or a same or equivalent value (e.g., may correspond to a same value) for serving cell/RAT and for target cell/RAT. For instance, in some cases where different values are used, a hysteresis may be applied to a serving cell/RAT signal characteristic threshold to reduce a frequency of redirections or handovers, and/or an offset may be applied to a target cell/RAT signal characteristic threshold, for instance, to encourage or discourage (depending on the offset value) redirections or handovers to the target cell/RAT.

Upon determining that TTT timer 324 has expired and determining that the signal characteristic of serving RAT 332 is less than signal characteristic threshold 342, RAT measurement component 140 may continue the procedure of obtaining target RAT frequency measurements 150 such that an MRM 130 is quickly transmitted to wireless serving node 116 and/or network 112 to increase IRAT redirection and handover.

In another aspect, RAT measurement component 140 may be configured to include the target RAT frequency measurement completion component 245 (FIG. 2) capable of determining, in response to the serving RAT signal characteristic being less than the signal characteristic threshold, that a target RAT frequency measurement 150 associated with the MRM 130 for performing IRAT handover cannot be completed within a time limit 242. For example, in an aspect, target RAT frequency measurement completion component 245 makes this determination in order to ensure that performing an IRAT handover may be possible. For instance, after determining that the signal characteristic of serving RAT, e.g., based on serving cell/RAT condition(s) 332, is less than signal characteristic threshold 342, target RAT frequency measurement completion component 245 determines that the time to complete target RAT frequency measurement 150 associated with the MRM 130, e.g., to obtain target cell/RAT conditions 334, will be greater than a time period 142, and as such, performing IRAT handover from TD-SCDMA to LTE for UE 114 may not be possible.

In an aspect, when UE 114 is completing frequency measurements for the target RAT close to an edge of the frequency coverage area of the serving RAT, target RAT frequency measurement completion component 245 may be configured to determine that a target RAT frequency measurement 150 associated with the MRM 130 may not be completed within time period 142 and performing IRAT handover may not be possible. For example, with prior solutions, a UE may attempt to wait for additional measurement gaps to complete the target RAT frequency measurement 150 associated with the MRM 130 for performing IRAT handover. In such prior solutions, transmissions of the MRM 130 may interfere with the serving RAT as UE at the edge of coverage of the serving RAT would need to send MRM 130 using a maximum transmission power on the reverse link. In this scenario, using the prior solutions, a base station such as wireless serving node 116 (or some other serving access node component of network 112) may not receive the MRM 130 because of signal path loss. As such, without receipt of the MRM 130, wireless serving node 116 (or base station or some other serving access node component of network 112) will be unable to perform the analysis for making IRAT redirection or IRAT handover decisions, e.g., comparing the received signal characteristic measurements and/or other information from MRM 130 to handover conditions. Thus, in this situation that results from prior solutions, no handover command will be sent from wireless serving node 116 (or the base station or other serving access node component of network 112) to UE 114. Accordingly, in this situation resulting from prior art solutions, UE 114 may not be able to establish a call in connected mode on the target RAT, thereby resulting in a call drop.

In other words, in some radio conditions such as when UE 114 is at or near the coverage boundary of a serving RAT, when the RAT measurement component 140 is not able to quickly complete the target RAT frequency measurement 150 associated with the MRM 130, then performing IRAT handover of UE 114 from TD-SCDMA to LTE may not be possible and a call drop may occur.

According to the present apparatus and methods, however, target RAT frequency measurement completion component 245 may determine that completion of target RAT frequency measurement 150 cannot be completed within time limit 142, and executes gap configuring component 249 to determine new measurement gap 148 having calculated measurement gap 146 in order to obtain target RAT frequency measurement 150. For example, the determination of target RAT frequency measurement completion component 245 may be based on one or more factors. These factors may include one or more of the size (e.g., measurement time duration) and the periodicity of a network configured measurement gap, the number of different frequency measurements to be made in the target RAT, and the number of network configured measurement gaps used to complete one target RAT frequency measurement.

For example, target RAT frequency measurement completion component 245 may be configured to determine that target RAT frequency measurement 150 associated with the MRM 130 may not be completed within time period 142 (e.g. a time window of 100 ms) based on a measurement gap duration 374 and/or a measurement gap periodicity 376 of a network-configured measurement gap 372 of current measurement gap configuration 144 and/or based on a number of RAT frequencies to be measured 380 (which may delay the measurement of the target frequency), as well as based on calculated measurement gap duration 146. More specifically, in an aspect, target RAT frequency measurement completion component 245 may be configured to determine that a sum of one or more measurement gap durations 374 of one or more network configured measurement gaps 372 within time limit 142 is less than a duration threshold 384. For example, duration threshold 384 may match calculated measurement gap duration 146, e.g., 30 ms, which may include a known amount of time need to obtain target RAT frequency measurement 150. In an alternative or additional aspect, target RAT frequency measurement completion component 245 may be configured to determine that the measurement gap periodicity 376 of network configured measurement gap 372 is greater than a periodicity threshold 386 (e.g., the measurement gap periodicity 376 of network configured measurement gap 372 is greater than 100 ms). As such, in this case, all or a required portion of network configured measurement gap 372 may not fall within time limit 142 when measurement gap periodicity 376 is too large. In an alternative or additional example, target RAT frequency measurement completion component 245 may be configured to determine that target RAT frequency measurement 150 associated with the MRM 130 may not be completed within time period 142 when the number of different RAT frequencies to be measured 380, as configured by network 112 in current measurement gap configuration 144, is extensive (e.g., the number of RAT frequencies to be measured are greater than ten). In this case, for instance, it may take a long time to cycle through all of the measurements before reaching or finishing target RAT frequency measurement 150. In an alternative or additional example, in this case, network 112 requires many small network configured measurement gaps 372 to complete one LTE frequency measurement.

Additionally, RAT measurement component 140 may be configured to include the gap duration calculating component 247 (FIG. 2) configured for calculating a measurement gap duration sufficient to complete the target RAT frequency measurement 150 associated with the MRM 130 for performing the IRAT handover. For example, upon determining that a frequency measurement for target RAT associated with the MRM 130 will not be completed within time limit 142, gap duration calculating component 247 then generates the calculated measurement gap duration 146 sufficient to complete the target RAT frequency measurement 150.

Also, RAT measurement component 140 may be configured to include the gap configuring component 249 (FIG. 2) capable of generating new measurement gap 148 having calculated measurement gap 146. Specifically, gap configuring component 249 may generate an entirely new measurement gap, or enlarge network configured measurement gap 372 based on the calculated measurement gap duration 146.

Moreover, RAT measurement component 140 may be configured to include the signal measurement component 249 (FIG. 2) described above.

Figure 4:
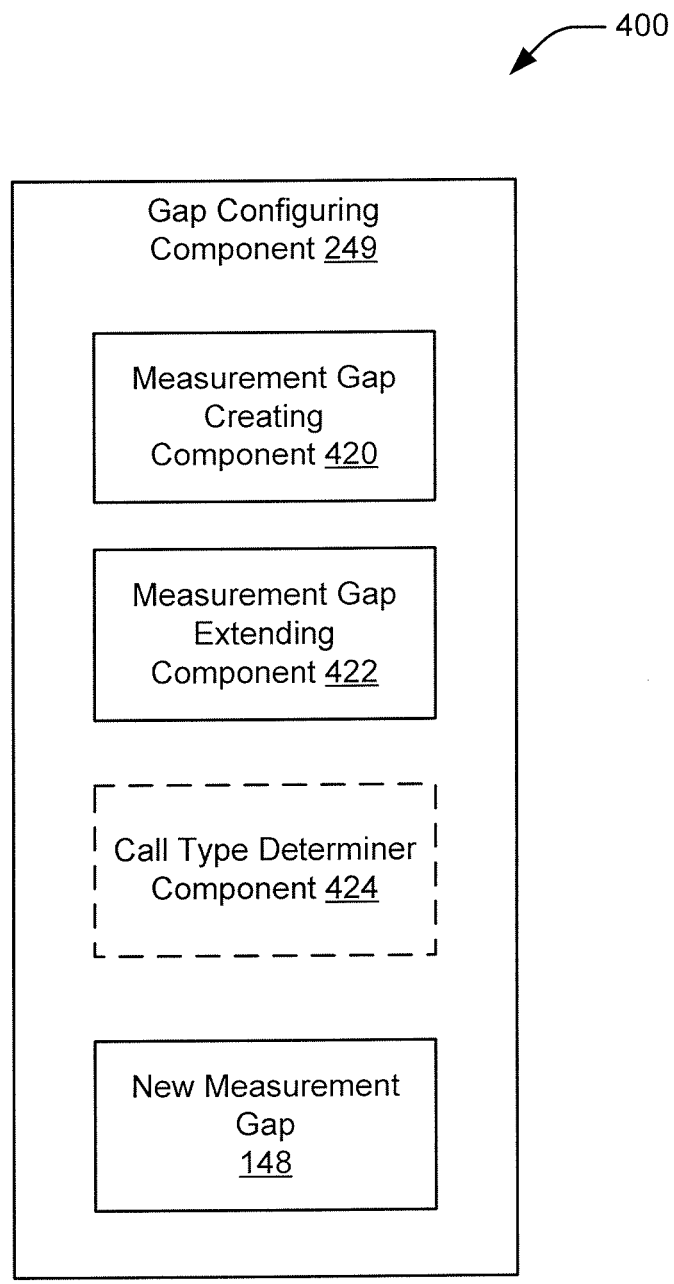
FIG. 4 is another schematic diagram illustrating a more detailed aspect of the components of the RAT measurement component of FIG. 1.

Referring to FIG. 4, another more detailed aspect of the gap configuring component 249 of FIGS. 1A, 2, and 3 may include additional components that interoperate to allow UE 114 to, for example, quickly complete and report TD-SCDMA to LTE IRAT measurements of a particular LTE frequency to network 112. In this aspect, gap configuring component 249 may be configured to include a measurement gap creating component 420 operable to generate an entirely new measurement gap, e.g., to configure new measurement gap 148 at a location outside of any network configured measurement gap 372 in current network configuration 144. For example, based on measurement gap duration 374 and measurement gap periodicity 376 of current measurement gap configuration 144, gap configuring component 249 may determine that no network configured measurement gap 372 falls within time limit 142. As such, measurement gap creating component 420 may generate new measurement gap 148 having calculated measurement gap duration 146 to fall within time limit 142. For instance, measurement gap creating component 420 may generate modified measurement gap configuration 194 (FIG. 1B) and request that the network configure UE 114 with this configuration. In an alternate or additional aspect, gap configuring component 249 also may be configured to include a measurement gap extending component 422 capable of extending the measurement gap duration 374 of the network configured measurement gap 372 based on the calculated measurement gap duration 146. For example, based on at least one of measurement gap duration 374 and measurement gap periodicity 376 of current measurement gap configuration 144, gap configuring component 249 may determine that a sum of one or more measurement gap durations 374 of one or more network configured measurement gaps 372 that fall within time limit is not sufficient to obtain target RAT frequency measurement 150. For example, measurement gap duration 374 of network configured measurement gap 372 may be less than duration threshold 384, and/or measurement gap periodicity 376 may be greater than periodicity threshold 386. The duration threshold 384 may be defined by the currently used standards, UE 114, or network 112. Accordingly, measurement gap extending component 422 may extend one or more measurement gap durations 374 of one or more network configured measurement gaps 372 to achieve calculated measurement gap duration 146. In an aspect, measurement gap extending component 422 may extend a single measurement gap duration 374 of a single network configured measurement gaps 372 to define new measurement gap 148 having calculated measurement gap duration 146. In an aspect, measurement gap extending component 422 may extend the single measurement gap duration 374 by initiating the single network configured measurement gap 372 earlier, or by terminating the single network configured measurement gap 372 later, or both. For instance, in an aspect, measurement gap extending component 422 may extend the single measurement gap duration 374 by initiating the single network configured measurement gap 372 earlier in order to complete target RAT frequency measurement 150 as soon as possible, and/or when there is not enough time before time limit 142 to change an end time of the measurement gap. Similarly, for instance, in an aspect, measurement gap extending component 422 may terminate the single network configured measurement gap 372 at a later time when the measurement gap cannot be started earlier and/or when sufficient time exist before time limit 142, For instance, in an example of an implementation aspect, which should not be construed as limiting, when the duration/periodicity of network configured measurement gap 374 is 10 ms/80 ms, gap configuring component 249 may modify the start and/or the end of a respective network configured measurement gap 372 occurring within time limit 142 to increase the duration. In other words, since one target RAT frequency measurement 150, e.g., one Long-Term Evolution Time-Division Duplex (LTE-TDD) frequency RSRP/RSRQ measurement, which may take 30 ms, may not be completed within measurement gap duration 374 of network configured measurement gap 372 of according to the duration/periodicity configuration of 10 ms/80 ms, gap configuring component 249 may extend measurement gap duration 374 by 20 ms to define new measurement gap 148 having calculated measurement gap duration 146. For instance, depending on the situation, measurement gap extending component 422 may add 20 ms to the beginning of a 10 ms measurement gap, or add 20 ms to the end of the 10 ms measurement gap, or modify the start or end time in any manner that results in a 30 ms duration. Therefore, by utilizing measurement gap extending component 422, the measurement gap may be extended by 20 ms to a total of 30 ms, and as such, UE 114 may be able to complete the target RAT frequency measurement 150 in one shot, e.g., in a single, continuous new measurement gap 148, in order to expedite an inter-RAT handover. Although discussed above with respect to network configured measurement gap 374 having a 10 ms/80 ms duration/periodicity configuration, it should be understood that the present aspects may apply to any duration/periodicity configuration, such as but not limited to a 20 ms/160 ms duration/periodicity configuration, or a 40 ms/320 ms duration/periodicity configuration, or a 40 ms/640 ms duration/periodicity configuration, Similarly, although target RAT frequency measurement 150 is discussed in the above example as taking 30 ms, such measurements may take any other period of time.

Indeed, the reconfiguration of network configured measurement gap 372 as new measurement gap 148 having calculated measurement gap duration 146 allows for completion of, for example, an LTE-TDD frequency measurement without having to wait until the next period a measurement gap is available for LTE-TDD frequency measurements. This will decrease the time delay for inter-RAT handover since there is ample time to determine the LTE-TDD frequency measurement for proper inter-RAT handover during each enlarged measurement gap, as opposed to waiting for enough measurement gaps to complete the LTE-TDD frequency measurement.

For instance, in another example of an implementation aspect, gap configuring component 249 may define new measurement gap 148 based on an earlier initiation of network configured measurement gap 372 to enable completion of target RAT frequency measurements 150 before the end of new measurement gap 148. In this manner, the time for inter-RAT handover to occur decreases since the target RAT frequency measurements 150 are completed before the end of the network configured measurement gap 372 and before the occurrence of the next network configured measurement gap 372. Moreover, in an aspect, the earlier initiation of network configured measurement gap 372 as defined by new measurement gap 148 may allow UE 114 to transmit MRM 130 to network 112 earlier, and in some cases even before an end of new measurement gap 148.

In an optional aspect, gap configuring component 249 may further include a call type determiner component 424 operable to restrict UE 114 to configuring new measurement gap 148 only when a certain call domain type is utilized.

In one implementation, for example, if call type determiner component 424 determines a call domain type for the target RAT and/or the serving RAT as being a packet switched call, then gap configuring component 249 may be allowed to configure new measurement gap 148, either by creating an entirely new measurement gap where no network configured measurement gap 372 previously existed or by expanding network configured measurement gap 372. In another implementation, for example, if call type determiner component 424 determines a call domain type is a circuit switched call, then gap configuring component 249 may not be allowed to generate new measurement gap 148. In yet another implementation, if call type determiner component 424 determines a call domain type is a packet switched call and a circuit switched call, then gap configuring component 249 may only be allowed to generate new measurement gap 148 for the packet switched part of the call.

It should be noted that applying such call domain type conditions may be based on certain policy procedures stored in the non-volatile memory of UE 114. Furthermore, the non-volatile memory of UE may also store criteria to remove the conditioning on call domain type for generating new measurement gap 148.

Figure 5:
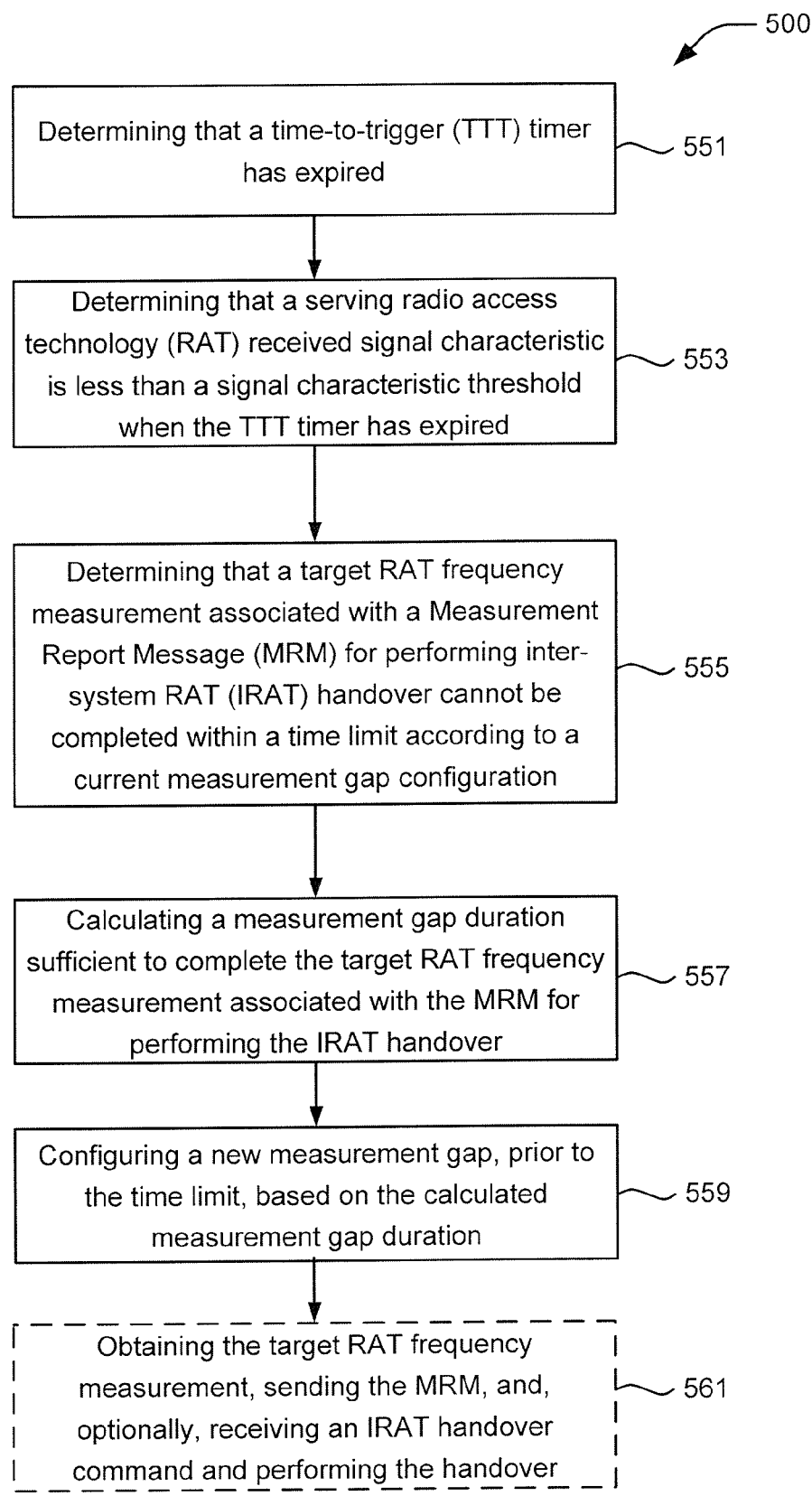
FIG. 5 is a flow diagram illustrating an aspect of a method of RAT measurement at a UE in a wireless communication system.

FIG. 5 is a flow diagram illustrating an aspect of a method 500 of the wireless communication system of FIGS. 1A, 1B, and 2-4. Method 500 may be performed by, for example, RAT measurement component 140 of UE 114. At 551, method 500 includes determining that a TTT timer has expired. For example, after certain event conditions defined by TTT parameters 322, UE 114 is triggered to start TTT timer and TTT timer expiration component 241 determines when TTT timer 324 has expired.

At 553, method 500 includes determining that a serving RAT signal characteristic is less than a signal characteristic threshold when the TTT timer has expired. For example, after TTT timer 324 has expired, signal characteristic threshold comparing component 243 of UE 114 determines when the signal characteristic of the serving RAT, e.g., wireless serving node 116 (FIG. 1A) is less than signal characteristic threshold 342.

At 555, method 500 includes determining, in response to the serving RAT signal characteristic being less than the signal characteristic threshold, that a target RAT frequency measurement associated with the MRM for performing IRAT handover cannot be completed within a time limit according to a current measurement gap configuration. For example, after determining that the signal characteristic of the serving RAT is less than signal characteristic threshold 342, target RAT frequency measurement completion component 245 may be configured to determine that target RAT frequency measurement 150 associated with the MRM 130 may not be completed within time limit 142 and performing IRAT handover may not be possible. Indeed, by determining that the time to complete a frequency measurement for a target RAT associated with the MRM 130 will be greater than time limit 142, target RAT frequency measurement completion component 245 may take subsequent measures to expedite sending MRM 130 to increase the chance of performing IRAT handover.

At 557, method 500 includes calculating a measurement gap duration sufficient to complete the target RAT frequency measurement associated with the MRM for performing the IRAT handover. For example, upon determining that target RAT frequency measurement 150 associated with the MRM 130 will not be completed within time limit 142, gap duration calculating component 247 then calculates the measurement gap duration 146 sufficient to complete target RAT frequency measurement 150.

At 559, method 500 includes configuring a new measurement gap prior to the time limit, wherein the new measurement gap comprises the calculated measurement gap duration. For example, upon calculating the measurement gap duration 146 sufficient to complete the target RAT frequency measurement 150 used for performing IRAT handover, gap configuring component 249 may be operable to configure new measurement gap 148, either by creating an entirely new measurement gap where no network configured measurement gap 372 previously existed or by enlarging network configured measurement gap 372 based on the calculated measurement gap duration 146. It should be noted that gap configuring component 249 may be capable of adding time to network configured measurement gap 372 at the end or beginning, based on measurement gap duration 374 and/or measurement gap periodicity 376 of network configured measurement gap 374 and further based on time limit 142 for performing target RAT frequency measurement 150. Further, configuring new measurement gap 148 may include configuring a single, continuous measurement gap that allows target RAT frequency measurement 150 to be obtained in one shot. Also, configuring new measurement gap 148 may include configuring the new measurement gap 148 to end in a minimum amount of time 196 from when the TTT timer has expired, e.g., expiration time 168.

In an optional, additional aspect, at 561, method 500 may include one or more of obtaining the target RAT frequency measurement, sending the MRM to the network, receiving an IRAT handover command, and performing the handover. In other words, method 500 may conclude with UE 114 expediting the target RAT frequency measurement and performing the subsequent reporting procedures that enable the network to evaluate the measurement and event information in the MRM in order to make an IRAT handover decision. If the network determines that a handover is warranted, then UE 114 will receive an IRAT handover command identifying the target RAT, thereby causing UE 114 to perform the IRAT handover.

Moreover, in an alternative or additional aspect, the entire method 500 or at least the configuring of new measurement gap 148 at 559 may be conditioned on a determined call domain type for the serving RAT, e.g., based on call domain type information of a current call. For example, the configuring may only when the current call domain type is a packet switched (PS) call domain.

In an aspect, for example, method 500 may be operated by UE 114 or network 112 (FIGS. 1A and 2) executing the RAT measurement component 140 (FIGS. 1A, 1B, and 2-6), or respective sub-components thereof.

Figure 6:
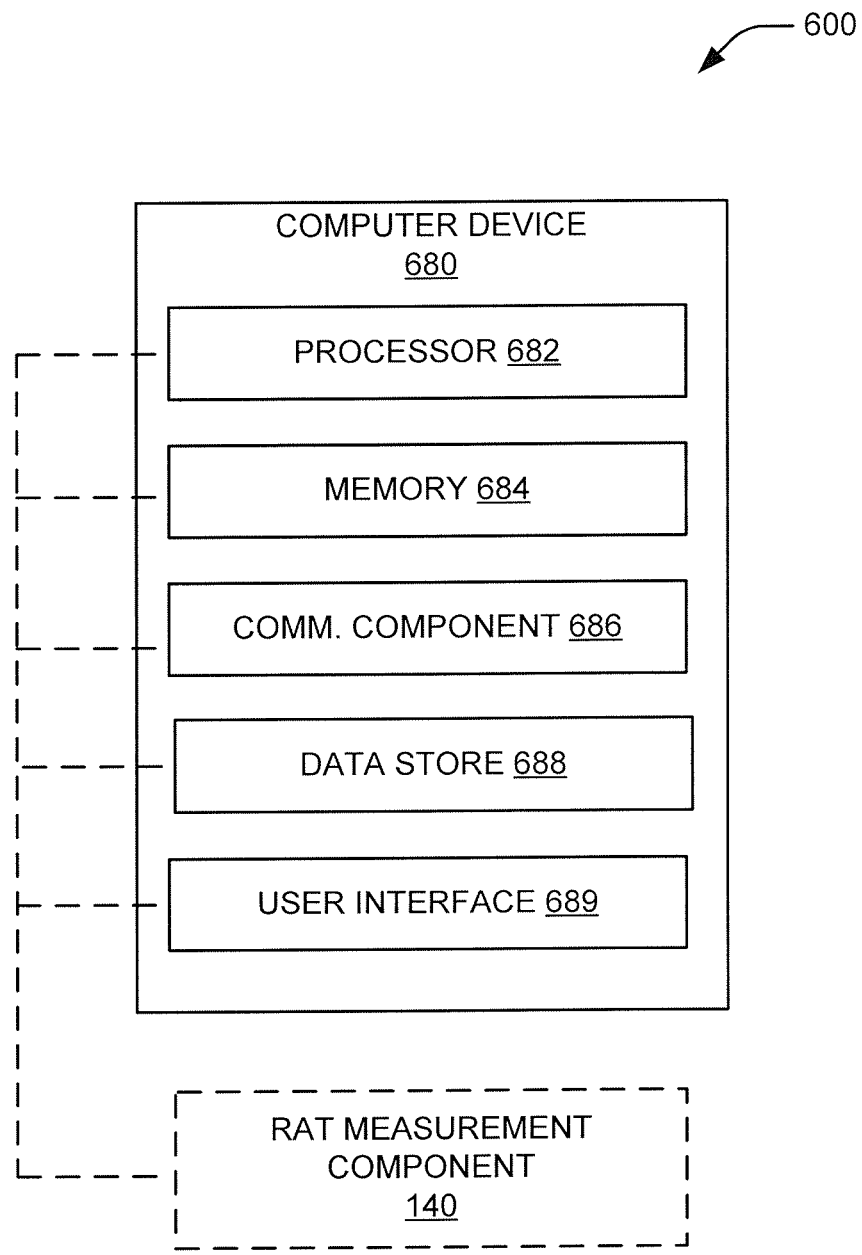
FIG. 6 is a block diagram illustrating aspects of a computer device including a RAT measurement reporting component according to the present disclosure.

Referring to FIG. 6, in one aspect, UE 114, including RAT measurement component 140 (FIGS. 1A, 1B, and 2-5), may be represented by a specially programmed or configured computer device 600. In one aspect, computer device 600 may include RAT measurement component 140 (FIGS. 1A, 1B, and 2-5), such as in a specially programmed computer readable instructions or code, firmware, hardware, or some combination thereof. Computer device 600 includes a processor 602 for carrying out processing functions associated with one or more of components and functions described herein, such as TTT timer expiration component 241, signal characteristic threshold comparing component 243, target RAT frequency measurement completion component 245, gap duration calculating component 247, and gap configuring component 249, and signal measurement component 251. Processor 602 can include a single or multiple set of processors or multi-core processors. Moreover, processor 602 can be implemented as an integrated processing system and/or a distributed processing system.

Computer device 600 further includes a memory 604, such as for storing data used herein and/or local versions of applications being executed by processor 602. Memory 604 can include any type of memory usable by a computer, such as random access memory (RAM), read only memory (ROM), tapes, magnetic discs, optical discs, volatile memory, non-volatile memory, and any combination thereof.

Further, computer device 600 includes a communications component 606 that provides for establishing and maintaining communications with one or more parties utilizing hardware, software, and services as described herein. Communications component 606 may carry communications between components on computer device 600, as well as between computer device 600 and external devices, such as devices located across a communications network and/or devices serially or locally connected to computer device 600. For example, communications component 606 may include one or more buses, and may further include transmit chain components and receive chain components associated with a transmitter and receiver, respectively, or a transceiver, operable for interfacing with external devices. In an additional aspect, communications component 606 may be configured to receive one or more pages from one or more subscriber networks. In a further aspect, such a page may correspond to the second subscription and may be received via the first technology type communication services.

Additionally, computer device 600 may further include a data store 608, which can be any suitable combination of hardware and/or software, that provides for mass storage of information, databases, and programs employed in connection with aspects described herein. For example, data store 608 may be a data repository for applications not currently being executed by processor 602 and/or any threshold values or finger position values.

Computer device 600 may additionally include a user interface component 610 operable to receive inputs from a user of computer device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Figure 7:
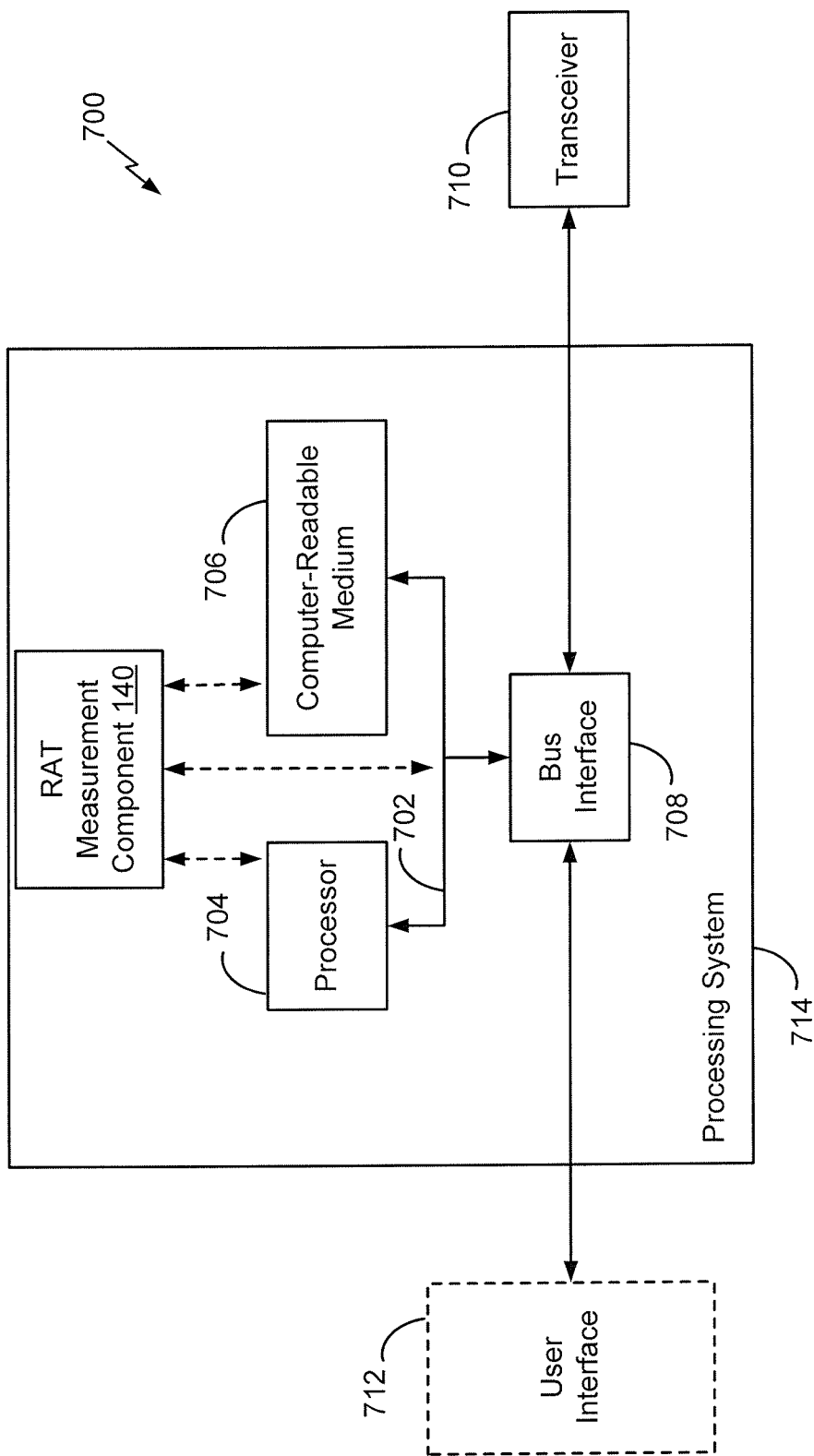
FIG. 7 is a block diagram illustrating an example of a hardware implementation for an apparatus employing a processing system executing a RAT measurement component to perform the functions described herein.

FIG. 7 is a block diagram illustrating an example of a hardware implementation for an apparatus 700 including RAT measurement component 140 (FIGS. 1A, 1B, and 2-6), employing a processing system 714 for carrying out aspects of the present disclosure, such as method 500 for quickly completing and reporting TD-SCDMA to LTE IRAT frequency measurements of a particular LTE frequency to a radio network. In this example, the processing system 714 may be implemented with bus architecture, represented generally by a bus 702. The bus 702 may include any number of interconnecting buses and bridges depending on the specific application of the processing system 714 and the overall design constraints. The bus 702 links together various circuits including one or more processors, represented generally by the processor 704, computer-readable media, represented generally by the computer-readable medium 706, and one or more components described herein, such as, but not limited to, RAT measurement component 140 (FIG. 1). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 707. The software, when executed by the processor 704, causes the processing system 714 to perform the various functions described infra for any particular apparatus. The computer-readable medium 707 may also be used for storing data that is manipulated by the processor 704 when executing software.

Figure 8:
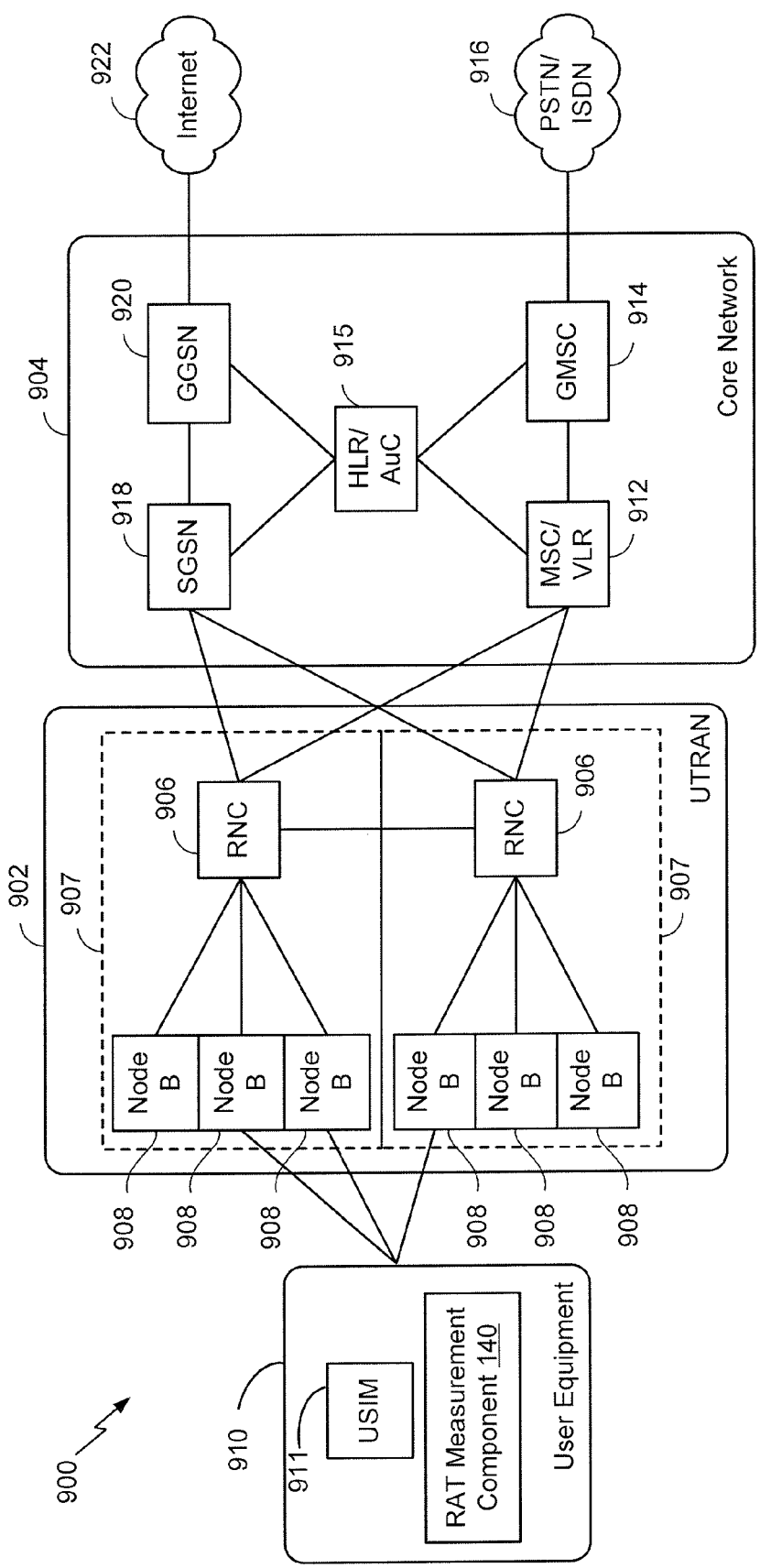
FIG. 8 is a block diagram conceptually illustrating an example of a telecommunications system including a UE configured to perform the functions described herein.

Referring to FIG. 8, by way of example and without limitation, the aspects of the present disclosure are presented with reference to a UMTS system 900 employing a W-CDMA air interface. A UMTS network includes three interacting domains: a Core Network (CN) 904, a UMTS Terrestrial Radio Access Network (UTRAN) 902, and User Equipment (UE) 910. UE 910 may be configured to include, for example, the RAT measurement component 140 (FIGS. 1A, 1B, and 2-6) for quickly completing and reporting TD-SCDMA to LTE IRAT frequency measurements of a particular LTE frequency to a radio network. In this example, the UTRAN 902 provides various wireless services including telephony, video, data, messaging, broadcasts, and/or other services. The UTRAN 902 may include a plurality of Radio Network Subsystems (RNSs) such as an RNS 907, each controlled by a respective Radio Network Controller (RNC) such as an RNC 906. Here, the UTRAN 902 may include any number of RNCs 906 and RNSs 907 in addition to the RNCs 906 and RNSs 907 illustrated herein. The RNC 906 is an apparatus responsible for, among other things, assigning, reconfiguring and releasing radio resources within the RNS 906. The RNC 906 may be interconnected to other RNCs (not shown) in the UTRAN 902 through various types of interfaces such as a direct physical connection, a virtual network, or the like, using any suitable transport network.

Communication between a UE 910 and a Node B 908 may be considered as including a physical (PHY) layer and a medium access control (MAC) layer. Further, communication between a UE 910 and an RNC 906 by way of a respective Node B 908 may be considered as including a radio resource control (RRC) layer. As used herein, the PHY layer may be considered layer 1, the MAC layer may be considered layer 2, and the RRC layer may be considered layer 3. Information herein may utilize terminology introduced in the RRC Protocol Specification, 3GPP TS 24.331, incorporated herein by reference.

The geographic region covered by the RNS 907 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 908 are shown in each RNS 907; however, the RNSs 907 may include any number of wireless Node Bs. The Node Bs 908 provide wireless access points to a CN 904 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 910 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 910 may further include a universal subscriber identity module (USIM) 911, which contains a user's subscription information to a network. For illustrative purposes, one UE 910 is shown in communication with a number of the Node Bs 908. The DL, also called the forward link, refers to the communication link from a Node B 908 to a UE 910, and the UL, also called the reverse link, refers to the communication link from a UE 910 to a Node B 908.

The CN 904 interfaces with one or more access networks, such as the UTRAN 902. As shown, the CN 904 is a GSM core network. However, as those skilled in the art will recognize, the various concepts presented throughout this disclosure may be implemented in a RAN, or other suitable access network, to provide UEs with access to types of CNs other than GSM networks.

The CN 904 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 904 supports circuit-switched services with a MSC 912 and a GMSC 914. In some applications, the GMSC 914 may be referred to as a media gateway (MGW). One or more RNCs, such as the RNC 906, may be connected to the MSC 912. The MSC 912 is an apparatus that controls call setup, call routing, and UE mobility functions. The MSC 912 also includes a VLR that contains subscriber-related information for the duration that a UE is in the coverage area of the MSC 912. The GMSC 914 provides a gateway through the MSC 912 for the UE to access a circuit-switched network 916. The GMSC 914 includes a home location register (HLR) 914 containing subscriber data, such as the data reflecting the details of the services to which a particular user has subscribed. The HLR is also associated with an authentication center (AuC) that contains subscriber-specific authentication data. When a call is received for a particular UE, the GMSC 914 queries the HLR 914 to determine the UE's location and forwards the call to the particular MSC serving that location.

The CN 904 also supports packet-data services with a serving GPRS support node (SGSN) 918 and a gateway GPRS support node (GGSN) 920. GPRS, which stands for General Packet Radio Service, is designed to provide packet-data services at speeds higher than those available with standard circuit-switched data services. The GGSN 920 provides a connection for the UTRAN 902 to a packet-based network 922. The packet-based network 922 may be the Internet, a private data network, or some other suitable packet-based network. The primary function of the GGSN 920 is to provide the UEs 910 with packet-based network connectivity. Data packets may be transferred between the GGSN 920 and the UEs 910 through the SGSN 918, which performs primarily the same functions in the packet-based domain as the MSC 912 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 908 and a UE 910. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 910 provides feedback to the node B 908 over the HS-DPCCH to indicate whether it correctly decoded a packet on the downlink.

HS-DPCCH further includes feedback signaling from the UE 910 to assist the node B 908 in taking the right decision in terms of modulation and coding scheme and precoding weight selection, this feedback signaling including the CQI and PCI.

"HSPA Evolved" or HSPA+ is an evolution of the HSPA standard that includes MIMO and QAM, enabling increased throughput and higher performance. That is, in an aspect of the disclosure, the node B 908 and/or the UE 910 may have multiple antennas supporting MIMO technology. The use of MIMO technology enables the node B 908 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 910 to increase the data rate, or to multiple UEs 910 to increase the overall system capacity. This is achieved by spatially precoding each data stream and then transmitting each spatially precoded stream through a different transmit antenna on the downlink. The spatially precoded data streams arrive at the UE(s) 910 with different spatial signatures, which enables each of the UE(s) 910 to recover the one or more the data streams destined for that UE 910. On the uplink, each UE 910 may transmit one or more spatially precoded data streams, which enables the node B 908 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
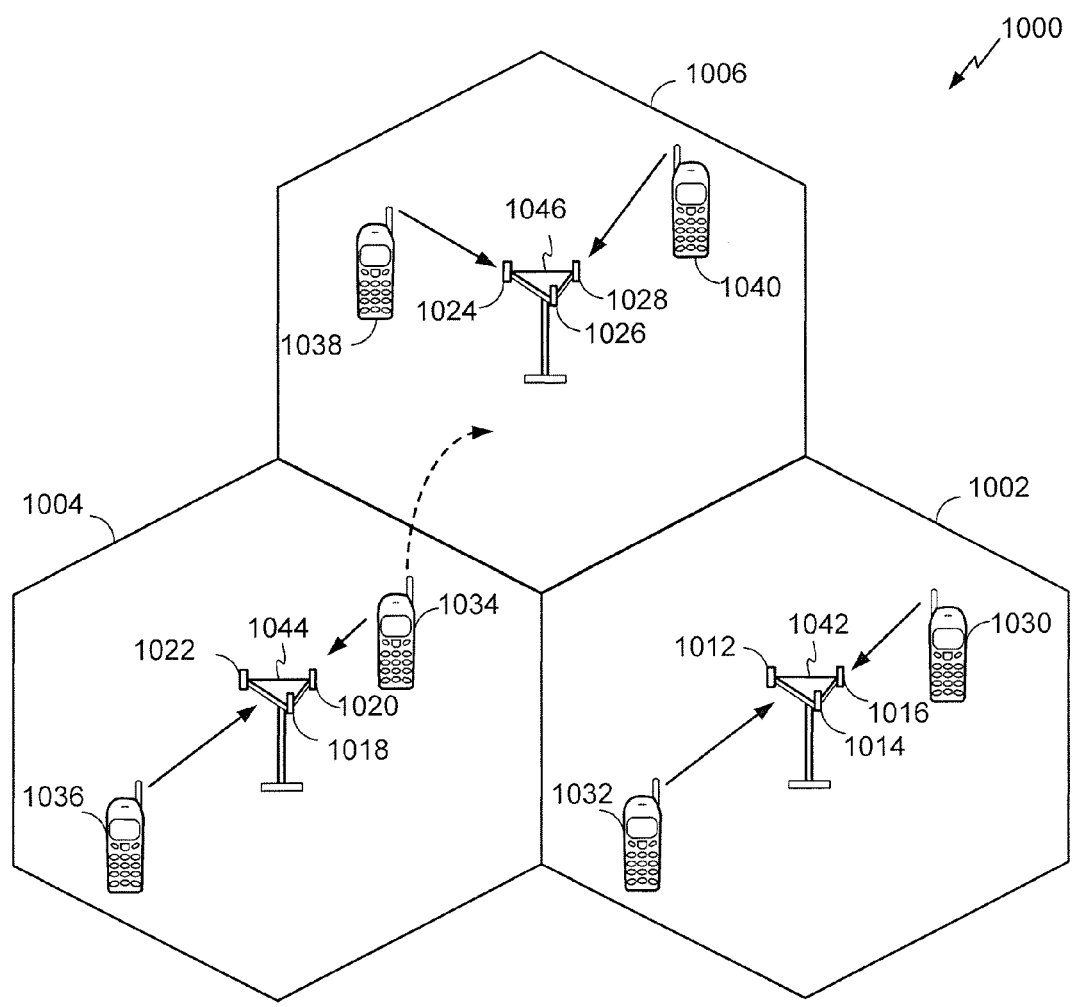
FIG. 9 is a conceptual diagram illustrating an example of an access network for use with a UE configured to perform the functions described herein.

Referring to FIG. 9, an access network 1000 in a UTRAN architecture is illustrated. The multiple access wireless communication system includes multiple cellular regions (cells), including cells 1002, 1004, and 1006, each of which may include one or more sectors. The multiple sectors can be formed by groups of antennas with each antenna responsible for communication with UEs in a portion of the cell. For example, in cell 1002, antenna groups 1012, 1014, and 1016 may each correspond to a different sector. In cell 1004, antenna groups 1018, 1020, and 1022 each correspond to a different sector. In cell 1006, antenna groups 1024, 1026, and 1028 each correspond to a different sector. The cells 1002, 1004 and 1006 may include several wireless communication devices, e.g., User Equipment or UEs, which may be in communication with one or more sectors of each cell 1002, 1004 or 1006. For example, UEs 1030 and 1032 may be in communication with Node B 1042, UEs 1034 and 1036 may be in communication with Node B 1044, and UEs 1038 and 1040 can be in communication with Node B 1046. Here, each Node B 1042, 1044, 1046 is configured to provide an access point to a CN 904 (see FIG. 8) for all the UEs 1030, 1032, 1034, 1036, 1038, 1040 in the respective cells 1002, 1004, and 1006. Node Bs 1042, 1044, 1046 and UEs 1030, 1032, 1034, 1036, 1038, 1040 respectively may be configured to include, for example, the RAT measurement component 140 (FIGS. 1A, 1B, and 2-6) for quickly completing and reporting TD-SCDMA to LTE IRAT frequency measurements of a particular LTE frequency to a radio network.

As the UE 1034 moves from the illustrated location in cell 1004 into cell 1006, a serving cell change (SCC) or handover may occur in which communication with the UE 1034 transitions from the cell 1004, which may be referred to as the source cell, to cell 1006, which may be referred to as the target cell. Management of the handover procedure may take place at the UE 1034, at the Node Bs corresponding to the respective cells, at a radio network controller 906 (see FIG. 8), or at another suitable node in the wireless network. For example, during a call with the source cell 1004, or at any other time, the UE 1034 may monitor various parameters of the source cell 1004 as well as various parameters of neighboring cells such as cells 1006 and 1002. Further, depending on the quality of these parameters, the UE 1034 may maintain communication with one or more of the neighboring cells. During this time, the UE 1034 may maintain an Active Set, that is, a list of cells that the UE 1034 is simultaneously connected to (i.e., the UTRA cells that are currently assigning a downlink dedicated physical channel DPCH or fractional downlink dedicated physical channel F-DPCH to the UE 1034 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
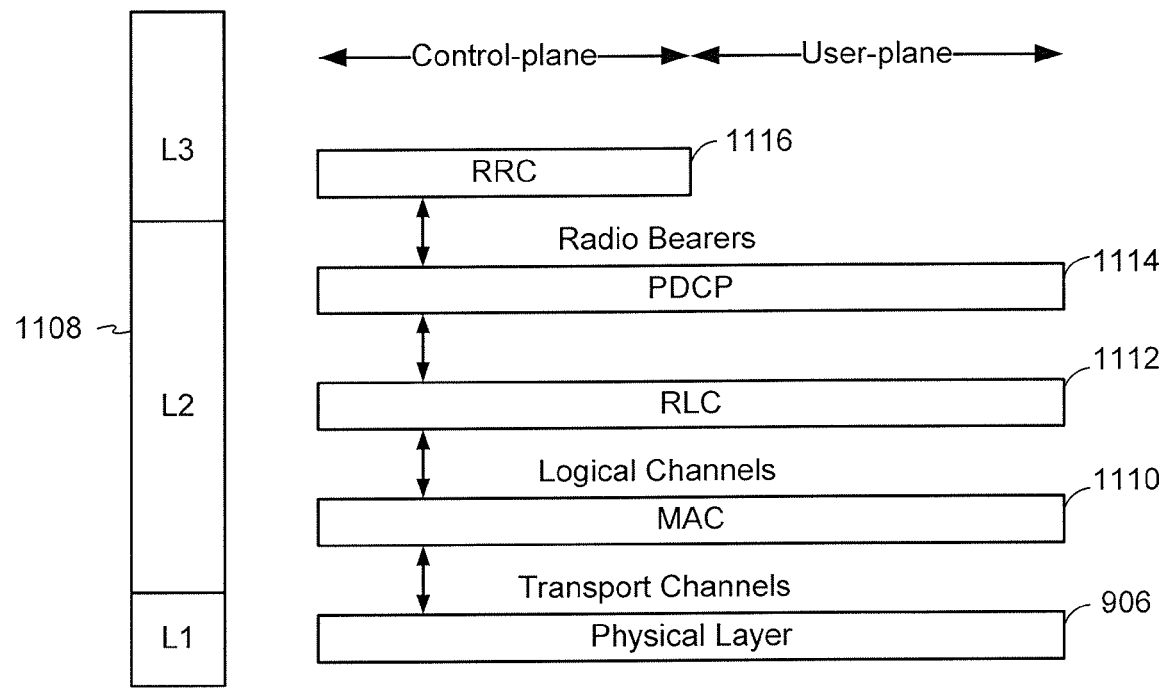
FIG. 10 is a conceptual diagram illustrating an example of a radio protocol architecture for the user and control planes for a base station and/or a UE configured to perform the functions described herein.

FIG. 10 is a conceptual diagram illustrating an example of the radio protocol architecture 1100 for the user plane and the control plane of a user equipment (UE) or node B/base station. For example, architecture 1100 may be included in a network entity and/or UE, such as wireless serving node 116 or wireless node 117 and/or UE 114 (FIGS. 1A and 2). The radio protocol architecture 1100 for the UE and node B is shown with three layers 1108: Layer 1, Layer 2, and Layer 3. Layer 1 is the lowest lower and implements various physical layer signal processing functions. As such, Layer 1 includes the physical layer 1106. Layer 2 (L2 layer) is above the physical layer 1106 and is responsible for the link between the UE and node B over the physical layer 1106. Layer 3 (L3 layer) includes a radio resource control (RRC) sublayer 1116. The RRC sublayer 1116 handles the control plane signaling of Layer 3 between the UE and the UTRAN.

In the user plane, the L2 layer includes a media access control (MAC) sublayer 1110, a radio link control (RLC) sublayer 1112, and a packet data convergence protocol (PDCP) 1114 sublayer, which are terminated at the node B on the network side. Although not shown, the UE may have several upper layers above the L2 layer including a network layer (e.g., IP layer) that is terminated at a PDN gateway on the network side, and an application layer that is terminated at the other end of the connection (e.g., far end UE, server, etc.).

The PDCP sublayer 1114 provides multiplexing between different radio bearers and logical channels. The PDCP sublayer 1114 also provides header compression for upper layer data packets to reduce radio transmission overhead, security by ciphering the data packets, and handover support for UEs between node Bs. The RLC sublayer 1112 provides segmentation and reassembly of upper layer data packets, retransmission of lost data packets, and reordering of data packets to compensate for out-of-order reception due to hybrid automatic repeat request (HARQ). The MAC sublayer 1110 provides multiplexing between logical and transport channels. The MAC sublayer 1110 is also responsible for allocating the various radio resources (e.g., resource blocks) in one cell among the UEs. The MAC sublayer 1110 is also responsible for HARQ operations.

Figure 11:
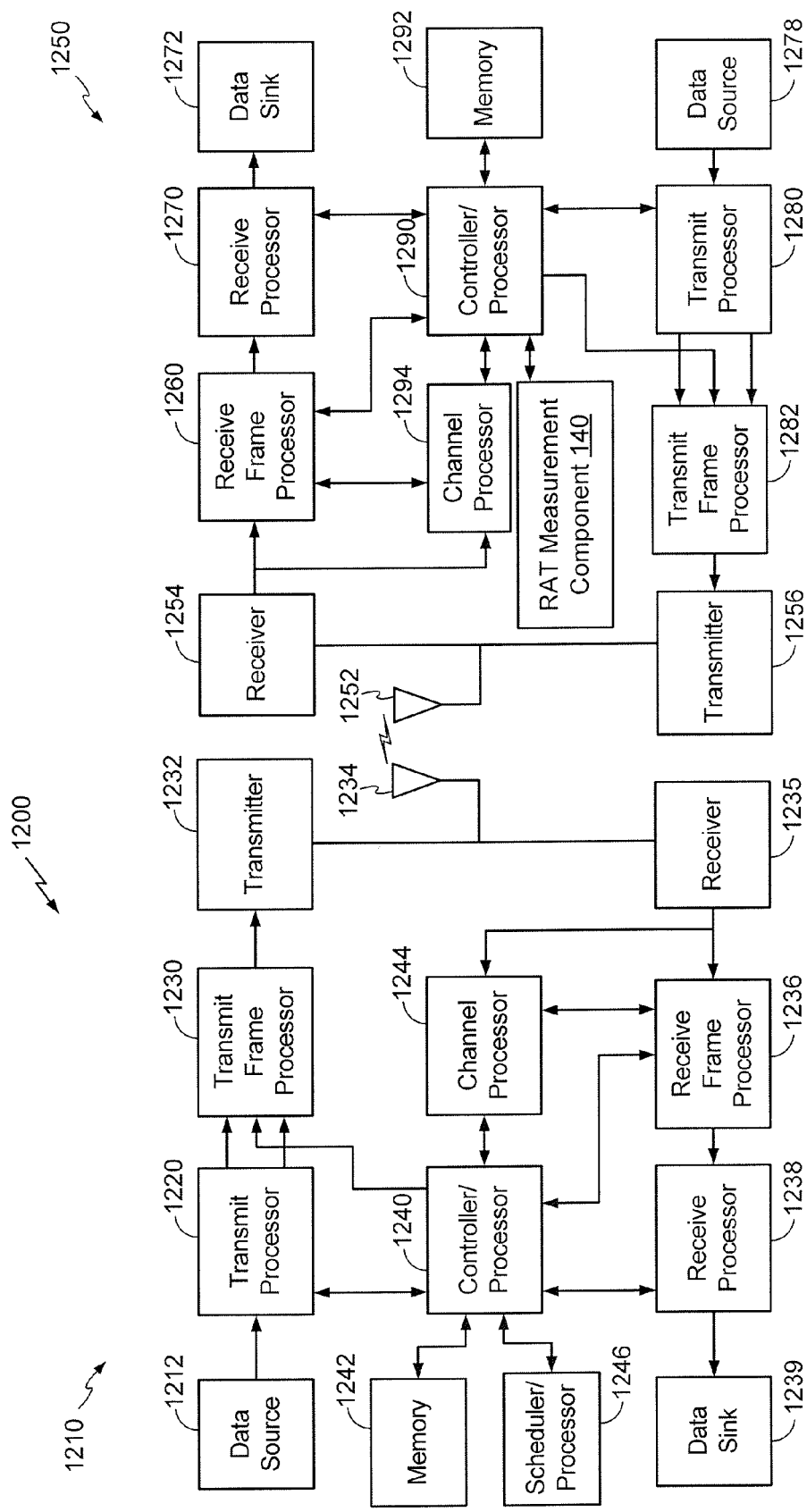
FIG. 11 is a block diagram conceptually illustrating an example of a Node B in communication with a UE in a telecommunications system configured to perform the functions described herein.

FIG. 11 is a block diagram of a communication system 1200 including a Node B 1210 in communication with a UE 1250, where Node B 1210 may be an entity within network 122 and the UE 1250 may be UE 124 according to the aspect described in FIGS. 1-3. UE 12450 may be configured to include, for example, the RAT measurement component 140 (FIGS. 1A, 1B, and 2-6) for quickly completing and reporting TD-SCDMA to LTE IRAT frequency measurements of a particular LTE frequency to a radio network by implementing the components described above, such as but not limited to TTT timer expiration component 241, signal characteristic threshold comparing component 243, target RAT frequency measurement completion component 245, gap duration calculating component 247, and gap configuring component 249. In the downlink communication, a transmit processor 1220 may receive data from a data source 1216 and control signals from a controller/processor 1240. The transmit processor 1220 provides various signal processing functions for the data and control signals, as well as reference signals (e.g., pilot signals). For example, the transmit processor 1220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1244 may be used by a controller/processor 1240 to determine the coding, modulation, spreading, and/or scrambling schemes for the transmit processor 1220. These channel estimates may be derived from a reference signal transmitted by the UE 1250 or from feedback from the UE 1250. The symbols generated by the transmit processor 1220 are provided to a transmit frame processor 1230 to create a frame structure. The transmit frame processor 1230 creates this frame structure by multiplexing the symbols with information from the controller/processor 1240, resulting in a series of frames. The frames are then provided to a transmitter 1232, which provides various signal conditioning functions including amplifying, filtering, and modulating the frames onto a carrier for downlink transmission over the wireless medium through antenna 1234. The antenna 1234 may include one or more antennas, for example, including beam steering bidirectional adaptive antenna arrays or other similar beam technologies.

At the UE 1250, a receiver 1244 receives the downlink transmission through an antenna 1242 and processes the transmission to recover the information modulated onto the carrier. The information recovered by the receiver 1244 is provided to a receive frame processor 1260, which parses each frame, and provides information from the frames to a channel processor 1294 and the data, control, and reference signals to a receive processor 1270. The receive processor 1270 then performs the inverse of the processing performed by the transmit processor 1220 in the Node B 1210. More specifically, the receive processor 1270 descrambles and despreads the symbols, and then determines the most likely signal constellation points transmitted by the Node B 1210 based on the modulation scheme. These soft decisions may be based on channel estimates computed by the channel processor 1294. The soft decisions are then decoded and deinterleaved to recover the data, control, and reference signals. The CRC codes are then checked to determine whether the frames were successfully decoded. The data carried by the successfully decoded frames will then be provided to a data sink 1272, which represents applications running in the UE 1250 and/or various user interfaces (e.g., display). Control signals carried by successfully decoded frames will be provided to a controller/processor 1290. When frames are unsuccessfully decoded by the receiver processor 1270, the controller/processor 1290 may also use an acknowledgement (ACK) and/or negative acknowledgement (NACK) protocol to support retransmission requests for those frames.

In the uplink, data from a data source 1278 and control signals from the controller/processor 1290 are provided to a transmit processor 1280. The data source 1278 may represent applications running in the UE 1250 and various user interfaces (e.g., keyboard). Similar to the functionality described in connection with the downlink transmission by the Node B 1210, the transmit processor 1280 provides various signal processing functions including CRC codes, coding and interleaving to facilitate FEC, mapping to signal constellations, spreading with OVSFs, and scrambling to produce a series of symbols. Channel estimates, derived by the channel processor 1294 from a reference signal transmitted by the Node B 1210 or from feedback contained in the midamble transmitted by the Node B 1210, may be used to select the appropriate coding, modulation, spreading, and/or scrambling schemes. The symbols produced by the transmit processor 1280 will be provided to a transmit frame processor 1282 to create a frame structure. The transmit frame processor 1282 creates this frame structure by multiplexing the symbols with information from the controller/processor 1290, resulting in a series of frames. The frames are then provided to a transmitter 1246, which provides various signal conditioning functions including amplification, filtering, and modulating the frames onto a carrier for uplink transmission over the wireless medium through the antenna 1242.

The uplink transmission is processed at the Node B 1210 in a manner similar to that described in connection with the receiver function at the UE 1250. A receiver 1234 receives the uplink transmission through the antenna 1234 and processes the transmission to recover the information modulated onto the carrier. The information recovered by the receiver 1234 is provided to a receive frame processor 1236, which parses each frame, and provides information from the frames to the channel processor 1244 and the data, control, and reference signals to a receive processor 1238. The receive processor 1238 performs the inverse of the processing performed by the transmit processor 1280 in the UE 1250. The data and control signals carried by the successfully decoded frames may then be provided to a data sink 1239 and the controller/processor, respectively. If some of the frames were unsuccessfully decoded by the receive processor, the controller/processor 1240 may also use an acknowledgement (ACK) and/or negative acknowledgement (NACK) protocol to support retransmission requests for those frames.

The controller/processors 1240 and 1290 may be used to direct the operation at the Node B 1210 and the UE 1250, respectively. For example, the controller/processors 1240 and 1290 may provide various functions including timing, peripheral interfaces, voltage regulation, power management, and other control functions. The computer readable media of memories 1242 and 1292 may store data and software for the Node B 1210 and the UE 1250, respectively. A scheduler/processor 1246 at the Node B 1210 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE)

(in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.10 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, machine-executable code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C. §112, sixth paragraph, or similar provisions, unless the element is expressly recited using the phrase "means for" or, in the case of a method claim, the element is recited using the phrase "step for."

What is claimed is:

1. A method of wireless communication operable by a user equipment (UE), comprising:
   determining, by the UE, that a time-to-trigger (TTT) timer has expired;
   determining, by the UE, that a serving radio access technology (RAT) received signal characteristic is less than a signal characteristic threshold when the TTT timer has expired;
   determining, by the UE and based on the serving RAT received signal characteristic being less than the signal characteristic threshold, that a target RAT frequency measurement associated with, a Measurement Report Message (MRM) for performing an inter-RAT (IRAT) handover cannot be completed within a time limit according to a current measurement gap configuration, wherein the current measurement gap configuration is configured at the UE by a network;
   calculating, by the UE, a measurement gap duration sufficient to complete the target RAT frequency measurement associated with the MRM for performing the IRAT handover; and
   configuring, by the UE, a new measurement gap for performing the target RAT frequency measurement prior to the time limit, wherein the new measurement gap comprises the calculated measurement gap duration.

2. The method of claim 1, wherein configuring the new measurement gap further comprises configuring a continuous measurement gap having the calculated measurement gap duration.

3. The method of claim 1, wherein configuring the new measurement gap further comprises creating the new measurement gap where no network configured measurement gap previously existed.

4. The method of claim 1, wherein configuring the new measurement gap further comprises configuring the new measurement gap to end in a minimum amount of time from the determining that the TTT timer has expired.

5. The method of claim 1, wherein determining that the target RAT frequency measurement cannot be completed within the time limit is based on whether a determined periodicity of the current measurement gap configuration is greater than a periodicity threshold.

6. The method of claim 1, wherein determining that the target RAT frequency measurement cannot be completed within the time limit is based on a number of network configured measurement gaps needed to complete one target RAT frequency measurement.

7. The method of claim 1, wherein determining that the target RAT frequency measurement cannot be completed within the time limit is based on a number of different target RAT frequencies to be measured delaying completion of the target RAT frequency measurement.

8. The method of claim 1, wherein configuring the new measurement gap comprises extending a duration of a network configured measurement gap.

9. The method of claim 8, wherein extending the duration of the network configured measurement gap comprises ending the network configured measurement gap at a later time.

10. The method of claim 8, wherein extending the duration of the network configured measurement gap comprises starting a beginning of the network configured measurement gap at an earlier time.

11. The method of claim 1, wherein configuring the new measurement gap is based on a current call domain type information.

12. The method of claim 11, wherein the current call domain type information identifies a packet switched call.

13. The method of claim 1, wherein the serving RAT operates based on Time Division Synchronous Code Division Multiple Access (TD-SCDMA) and the target RAT operates based on Long Term Evolution (LTE).

14. An apparatus for wireless communication, comprising:
at least one processor; and:
a memory coupled to the at least one processor;
wherein the at least one processor is configured to:
 determine that a time-to-trigger (TTT) timer has expired;
 determine that a serving radio access technology (RAT) received signal characteristic is less than a signal characteristic threshold when the TTT timer has expired;
 determine, based on the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration, wherein the current measurement gap configuration is configured at the apparatus by a network;
 calculate a measurement gap duration sufficient to complete the target RAT frequency measurement associated with the MRM for performing the IRAT handover; and
 configure a new measurement gap for performing the target RAT frequency measurement prior to the time limit, wherein the new measurement gap comprises the calculated measurement gap duration.

15. The apparatus of claim 14, wherein the new measurement gap comprises a continuous measurement gap having the calculated measurement gap duration.

16. The apparatus of claim 14, wherein the at least one processor is further configured to create the new measurement gap further where no network configured measurement gap previously existed.

17. The apparatus of claim 14, wherein the at least one processor is further configured to configure the new measurement gap to end in a minimum amount of time from determining that the TTT timer has expired.

18. The apparatus of claim 14, wherein the at least one processor is further configured to determine that the target RAT frequency measurement cannot be completed within the time limit based on whether a determined periodicity of the current measurement gap configuration is greater than a periodicity threshold.

19. The apparatus of claim 14, wherein the at least one processor is further configured to determine that the target RAT frequency measurement cannot be completed within the time limit based on a number of network configured measurement gaps needed to complete one target RAT frequency measurement.

20. The apparatus of claim 14, wherein the at least one processor is further configured to determine that the target RAT frequency measurement cannot be completed within the time limit based on a number of different target RAT frequencies to be measured delaying completion of the target RAT frequency measurement.

21. The apparatus of claim 14, wherein the at least one processor is further configured to configure the new measurement gap to extend a duration of a network configured measurement gap.

22. The apparatus of claim 21, wherein the at least one processor is further configured to extend the duration of the network configured measurement gap by ending the network configured measurement gap at a later time.

23. The apparatus of claim 21, wherein the at least one processor is further configured to extend the duration of the network configured measurement gap by starting a beginning of the network configured measurement gap at an earlier time.

24. The apparatus of claim 14, wherein the at least one processor is further configured to configure the new measurement gap based on a current call domain type information.

25. The apparatus of claim 24, wherein the call domain type information identifies a packet switched call.

26. The apparatus of claim 14, wherein the serving RAT operates based on Time Division Synchronous Code Division Multiple Access (TD-SCDMA) and the target RAT operates based on Long Term Evolution (LTE).

27. An apparatus of wireless communication, comprising:
 means for determining that a time-to-trigger (TTT) timer has expired;
 means for determining that a serving radio access technology (RAT) received signal characteristic is less than a signal characteristic threshold when the TTT timer has expired;
 means for determining, based on the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration, wherein the current measurement gap configuration is configured at the apparatus by a network;
 means for calculating a measurement gap duration sufficient to complete the target RAT frequency measurement associated with the MRM for performing the IRAT handover; and
 means for configuring a new measurement gap for performing the target RAT frequency measurement prior to the time limit, wherein the new measurement gap comprises the calculated measurement gap duration.

28. The apparatus of claim 27, wherein the means for configuring the new measurement gap further comprises means for configuring a continuous measurement gap having the calculated measurement gap duration.

29. A non-transitory computer-readable medium, comprising machine-executable code for wireless communication of a user equipment (UE), wherein the code comprises:
- code for determining, by the UE, that a time-to-trigger (TTT) timer has expired;
- code for determining, by the UE, that a serving radio access technology (RAT) received signal characteristic is less than a signal characteristic threshold when the TTT timer has expired;
- code for determining, by the UE and based on the serving RAT received signal characteristic being less than the signal characteristic threshold, that a target RAT frequency measurement associated with a Measurement Report Message (MRM) for performing an inter-RAT (IRAT) handover cannot be completed within a time limit according to a current measurement gap configuration, wherein the current measurement gap configuration is configured at the UE by a network;
- code for calculating, by the UE, a measurement gap duration sufficient to complete the target RAT frequency measurement associated with the MRM for performing the IRAT handover; and
- code for configuring, by the UE, a new measurement gap for performing the target RAT frequency measurement prior to the time limit, wherein the new measurement gap comprises the calculated measurement gap duration.

30. The non-transitory computer-readable medium of claim 29, wherein the code for configuring the new measurement gap further comprises code for configuring a continuous measurement gap having the calculated measurement gap duration.

* * * * *